United States Patent

Okamoto et al.

(10) Patent No.: US 8,612,092 B2
(45) Date of Patent: Dec. 17, 2013

(54) VEHICLE HEAT SOURCE CONTROL DEVICE AND METHOD FOR CONTROLLING VEHICLE HEAT SOURCE

(75) Inventors: Tsuyoshi Okamoto, Karyia (JP);
Tsutomu Tashiro, Nagoya (JP);
Keisuke Tani, Anjo (JP)

(73) Assignee: Denso Corporation, Kariya (JP)

( * ) Notice: Subject to any disclaimer, the term of this patent is extended or adjusted under 35 U.S.C. 154(b) by 149 days.

(21) Appl. No.: 13/343,211

(22) Filed: Jan. 4, 2012

(65) Prior Publication Data

US 2012/0179329 A1 Jul. 12, 2012

(30) Foreign Application Priority Data

Jan. 6, 2011 (JP) .................................. 2011-000944

(51) Int. Cl.
*B60H 1/00* (2006.01)
*B60H 1/03* (2006.01)
*B60H 1/14* (2006.01)

(52) U.S. Cl.
USPC ......................... 701/36; 237/12.3 R; 165/202

(58) Field of Classification Search
None
See application file for complete search history.

(56) References Cited

U.S. PATENT DOCUMENTS

| 2008/0115487 | A1* | 5/2008 | Harada et al. | 60/320 |
| 2011/0109157 | A1 | 5/2011 | Tani | |
| 2012/0074238 | A1* | 3/2012 | Morita et al. | 237/5 |
| 2012/0160447 | A1* | 6/2012 | Kinomura et al. | 165/51 |

FOREIGN PATENT DOCUMENTS

JP 3704788 8/2005

* cited by examiner

*Primary Examiner* — James Trammell
*Assistant Examiner* — Demetra Smith-Stewart
(74) *Attorney, Agent, or Firm* — Nixon & Vanderhye P.C.

(57) ABSTRACT

A request heat calculation unit calculates a request heat power requested to heat sources to supply. A heat cost calculation unit calculates a relationship between a heat power supplied from each of the heat sources and a heat cost, which is a fuel quantity consumed to supply a unit heat power. An abnormal source detection unit detects an abnormal heat source, which cannot normally supply a heat power, from the heat sources. An abnormal heat calculation unit calculates an abnormal heat power supplied from the abnormal heat source. A determination unit determines distribution of heat power supplied from the heat sources based on both the relationship and the abnormal heat power, such that a sum of the heat power supplied from the heat sources coincides with the request heat power, and the heat cost of all the heat sources is minimized.

12 Claims, 9 Drawing Sheets

VEHICLE HEAT SOURCE CONTROL DEVICE AND METHOD FOR CONTROLLING VEHICLE HEAT SOURCE

CROSS REFERENCE TO RELATED APPLICATIONS

This application is based on Japanese Patent Application No. 2011-944 filed on Jan. 6, 2011, the contents of which are incorporated in their entirely herein by reference.

FIELD OF THE INVENTION

The present invention relates to a device for controlling heat supply from heat sources of a vehicle. The present invention further relates to a method for controlling the heat supply from heat sources.

BACKGROUND OF THE INVENTION

In recent years, various technologies have been developed from a viewpoint of reducing the quantity of fuel consumed in a vehicle. For example, there have been developed a hybrid vehicle, which has an electric motor as a main unit mounted in a vehicle in addition to an engine, and an idling stop system for automatically stopping an engine when a vehicle stops.

In general, in the heating of the interior of a cabin, heat wasted to the coolant and the rest from an engine is utilized. However, in the low fuel consumption vehicle taken as an example, the heat power wasted from the engine is reduced because of an idling stop and an improvement in the efficiency of the engine itself, which causes a possibility that a heat power necessary for heating cannot be ensured only by the waste heat from the engine.

Thus, there is proposed a construction in which a vehicle has a heating device of a heat pump type, which is driven by an electric motor, in addition to a heating device utilizing the waste heat from the engine (see, for example, Japanese Patent Publication No. 3704788).

By the way, the construction described in Japanese Patent Publication No. 3704788 includes a plurality of heat sources used for heating the interior of the cabin and hence presents a problem how much and which of the heat sources is to be used from the viewpoint of efficient use of energy.

However, the construction described in Japanese Patent Publication No. 3704788 does not establish a principle of supplying heat from the plurality of heat sources but still has plenty room for improvement. Moreover, in the case where an abnormal heat source which cannot properly supply heat is caused in the plurality of heat sources, how to supply the heat from the plurality of heat sources including the abnormal heat source becomes a problem.

SUMMARY OF THE INVENTION

The present invention is made in view of these actual circumstances, and the object of the present invention is to reduce a fuel quantity consumed to supply heat even in the case where an abnormal heat source is caused in a plurality of heat sources mounted in a vehicle.

According to an aspect of the present invention, a vehicle heat source control device configured to control heat supply from a plurality of heat sources equipped in a vehicle to a heat exchange part, the vehicle heat source control device comprises a request heat power calculation unit configured to calculate a request heat power, which is requested to the plurality of heat sources to supply to the heat exchange part. The vehicle heat source control device further comprises a heat cost calculation unit configured to calculate a relationship between a heat power supplied from each of the plurality of heat sources and a heat cost being a fuel quantity consumed to supply a unit heat power. The vehicle heat source control device further comprises an abnormal heat source detection unit configured to detect an abnormal heat source, which is incapable of normally supplying a heat power, from the plurality of heat sources. The vehicle heat source control device further comprises an abnormal heat power calculation unit configured to calculate an abnormal heat power, which is a heat power supplied from the abnormal heat source. The vehicle heat source control device further comprises a heat distribution determination unit configured to determine distribution of heat power supplied from the plurality of heat sources based on both: the relationship between the heat power supplied from each of the plurality of heat sources and the heat cost; and the abnormal heat power, such that: a sum total of the heat power supplied from the plurality of heat sources coincides with the request heat power; and the heat cost of all of the plurality of heat sources to supply the heat power is minimized.

According to another aspect of the present invention, a method for controlling heat supply from a plurality of heat sources equipped in a vehicle to a heat exchange part, the method comprises calculating a request heat power, which is requested to the plurality of heat sources to supply to the heat exchange part. The method further comprises calculating a relationship between a heat power supplied from each of the plurality of heat sources and a heat cost, which is a fuel quantity consumed to supply a unit heat power. The method further comprises detecting an abnormal heat source, which is incapable of normally supplying a heat power, from the plurality of heat sources. The method further comprises calculating an abnormal heat power being a heat power supplied from the abnormal heat source. The method further comprises determining distribution of heat power supplied from the plurality of heat sources based on both: the relationship between the heat power supplied from each of the plurality of heat sources and the heat cost; and the abnormal heat power, such that: a sum total of the heat power supplied from the plurality of heat sources coincides with the request heat power; and the heat cost of all of the plurality of heat sources to supply the heat power is minimized.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Hereinafter, an embodiment will be described with reference to the drawings.

The present embodiment is embodied as a system for controlling heat supply from a plurality of heat sources mounted in a vehicle to a heat exchange part and electric power supply from a plurality of power sources to a plurality of electric loads at the time of heating the interior of a cabin.

Figure 1:
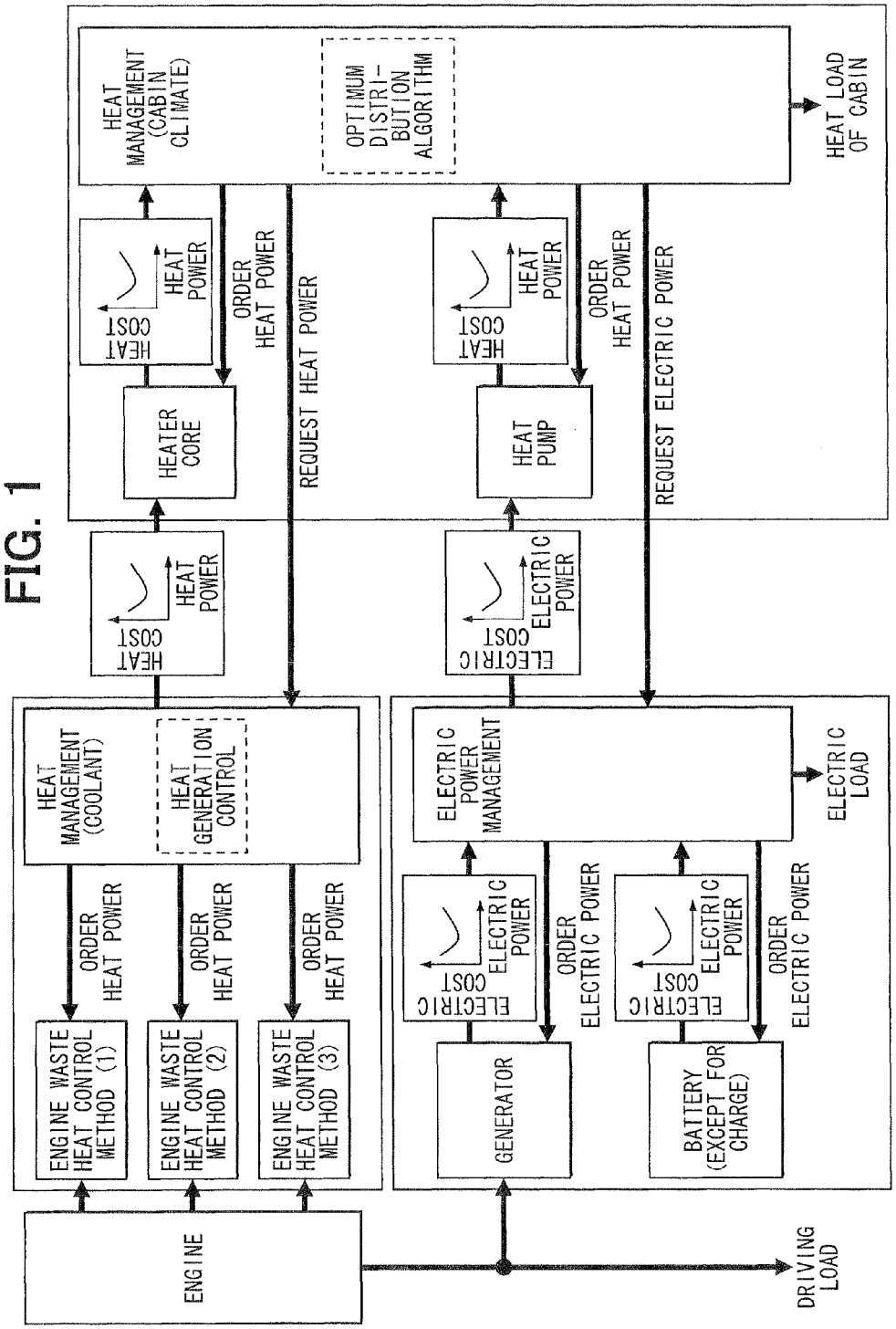
FIG. 1 is a block diagram to show a general outline of control of heat supply and electric power supply in the present system.

The outline of control of the heat supply and the electric power supply in this system will be shown in FIG. 1. As shown in the drawing, in this system, the distribution of heat power to be supplied from the plurality of heat sources (supply load distribution of the respective heat sources) is determined in such a way that fuel consumed so as to supply heat to the respective heat exchange parts from a plurality of heat sources for heating is minimized.

As for the plurality of heat sources, the present system is provided with the heat power of coolant, such as cooling water, of an engine and a heat pump. Heat from the engine is supplied to the coolant of the engine and waste heat power control unit (1), (2), and (3) (engine heat sources) of the engine are used at the time of supplying the heat. Thus, the plurality of heat sources include the waste heat power control unit (1), (2), and (3) of the engine.

At this time, a combination of supply of heat is determined by the use of the waste heat power control unit (1), (2), and (3) in such a way that a fuel quantity consumed to generate the heat by the use of the waste heat power control unit (1), (2), and (3) is minimized. Specifically, in consideration of a heat cost that is a fuel quantity consumed to supply a unit heat power, a heat management is performed in such a way that the heat cost of all of the waste heat power control units (1), (2), and (3) is minimized (heat generation control). In the heat management of the coolant, the engine is controlled in such a way that an order heat power is supplied by the use of the waste heat power control unit (1), (2), and (3).

Further, there is considered a heat power supplied to air in the cabin through a heater core (heat exchange part) from the coolant and a heat power supplied to the air in the cabin from an indoor heat exchanger (heat exchange part) of a heat pump system (electrically operated heat source). A distribution of heat power from the coolant and the heat pump system is determined in such a way that a fuel quantity consumed so as to supply the heat power from the coolant and the heat pump system to the air in the cabin is minimized.

Also at this time, the heat management is performed in such a way that the heat cost of all of the coolant and the heat pump system is minimized (optimum distribution algorithm). In the heat management of the air in the cabin, a request heat power requested to be supplied to the coolant is sent to a heat management part of the coolant and the engine is controlled in such a way that the order heat power is supplied from the heat pump system. In this regard, the engine is controlled in such a way that the order heat power is supplied from the heater core.

Further, the vehicle is provided with the plurality of electric power sources, and the electric power source to supply the heat pump system and the other electric load with electric power is switched. As for the plurality of electric power sources, the vehicle is provided with a generator of the engine and a battery. An electric power management part controls the generator of the engine and the battery in such a way that the order electric power is supplied from the plurality of power sources.

As described above, the heat supply and the electric power supply in the respective parts are controlled in such a way that the fuel quantity consumed in this whole system is minimized at the time of heating the interior of the cabin.

Figure 2:
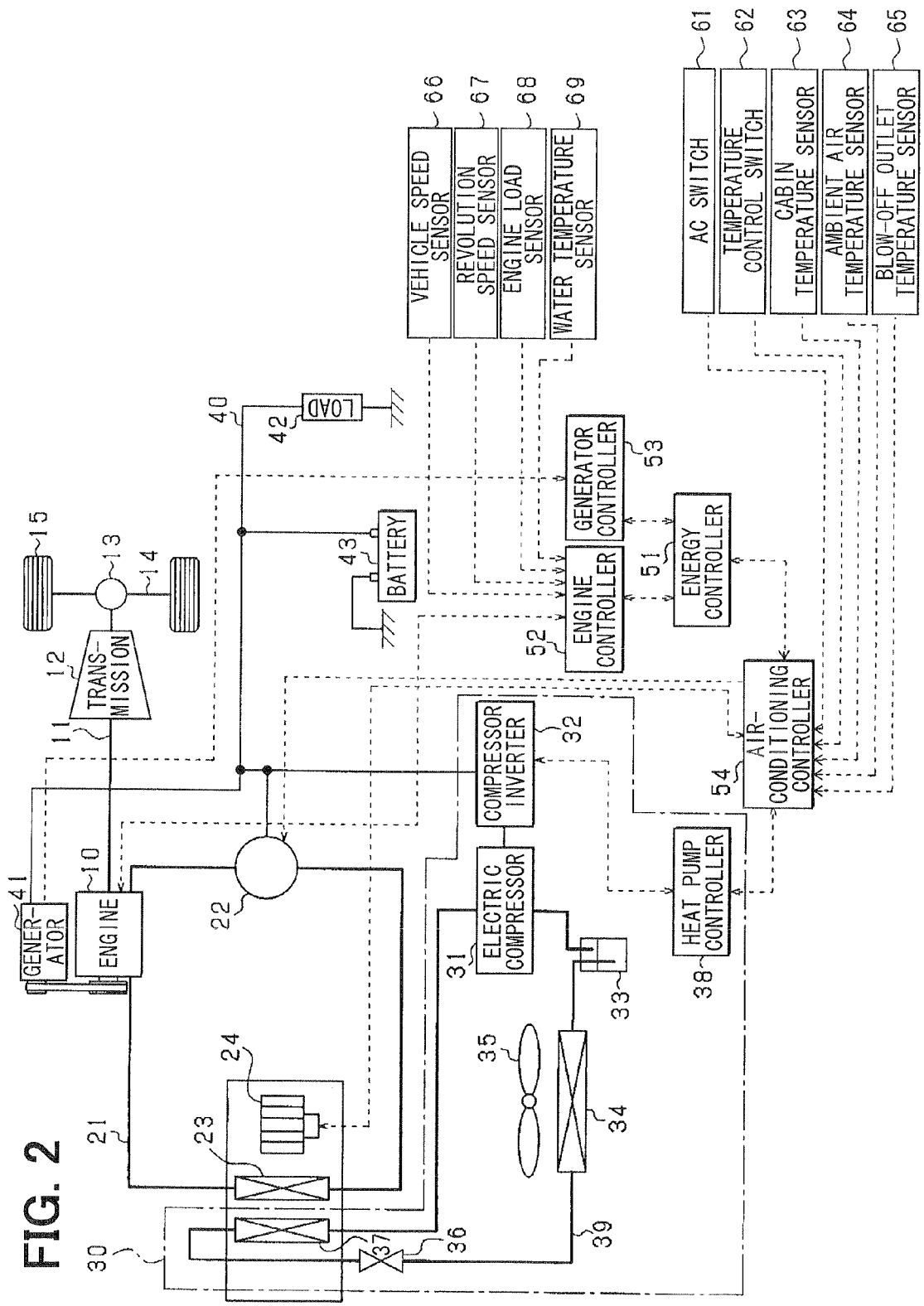
FIG. 2 is a schematic view to show a general construction of the present system.

FIG. 2 shows a general construction of the present system. As shown in the drawing, the present system is provided with an engine 10. The engine 10 is a multi-cylinder gasoline engine of a spark ignition type and includes a throttle valve, an intake valve, an exhaust valve, a fuel injection valve, an ignition unit, and an intake-side valve drive mechanism and an exhaust-side valve drive mechanism which control the opening/closing timing of the intake valve and the exhaust valve, respectively.

The driving force of the engine 10 is transmitted to a transmission 12 via a drive shaft 11 and further to an axle 14 and wheels 15 via a differential 13. On the other hand, when the vehicle is decelerated, the rotational force of the wheels 15 is transmitted to the transmission 12 via the axle 14 and the differential 13 and further to the engine 10 via the drive shaft 11.

A water jacket is formed in each of a cylinder block and a cylinder head of the engine 10, and the coolant is supplied in circulation into this water jacket, whereby the engine 10 is cooled. The water jacket has a coolant circulation passage 21, which is made of coolant piping and the rest, connected thereto, and the coolant circulation passage 21 includes an electrically operated pump 22 for circulating the coolant. The discharge quantity of the electrically operated pump 22 is varied, whereby the flow rate of the coolant circulated in the coolant circulation passage 21 is controlled.

The coolant circulation passage 21 is provided in such a way as to extend toward a heater core 23 (heat exchange part) on an exit side of the engine 10 and to return again to the engine 10 via the heater core 23. The heater core 23 has air-conditioned air sent thereinto from a blower fan 24. The air-conditioned air passes through the heater core 23 or the vicinity thereof, whereby the air-conditioned air receives heat from the heater core 23 and hence is heated to thereby supply the heated air into the interior of the cabin.

In the construction like this, the discharge quantity of the electrically operated pump 22 and the operating state of the blower fan 24 are controlled, whereby the heat power supplied to the interior of the cabin from the coolant via the heater core 23 is controlled.

Moreover, the present system has a heat pump system 30 (electrically operated heat source). This heat pump system 30 has an electrically operated compressor 31, an inverter 32 designed for a compressor, an indoor heat exchanger 37 (heat exchange part), an outdoor heat exchanger 34, a fan 35, an expansion valve 36, an accumulator 33, a refrigerant circulation passage 39 made of refrigerant piping and the rest for connecting these parts, and a heat pump control device 38.

The electrically operated compressor 31 compresses refrigerant to heat the refrigerant and this heated refrigerant is sent out to the indoor heat exchanger 37. The air-conditioned air is sent from the blower fan 24 and passes through the vicinity of the indoor heat exchanger 37 and receives heat from indoor heat exchanger 37, whereby the air-conditioned air is heated and the heated air is supplied to the interior of the cabin. At this time, the refrigerant dissipates heat, thereby being cooled.

The refrigerant passing through the indoor heat exchanger 37 has its pressure reduced by the expansion valve 36 and is sent out to the outdoor heat exchanger 34. Ambient air is sent into the outdoor heat exchanger 34 by the fan 35 and the refrigerant receives heat from the ambient air, thereby being heated. This heated refrigerant is sent out to the electrically operated compressor 31 via the accumulator 33.

The electrically operated compressor 31 is driven by electric power supplied from the inverter 32 for the compressor and the inverter 32 is controlled by the heat pump control device 38. The electrically operated compressor 31 has its operating state controlled through the heat pump control device 38 and the inverter 32, whereby the heat power supplied to the interior of the cabin from the heat pump system 30 via the indoor heat exchanger 37 is controlled.

The present system has a generator 41 (engine generator), which is driven by the drive force of the engine 10, and a battery 43, which is charged and discharged, as a power source. The generator 41 is an alternator or a motor generator. The respective electric power sources described above are connected to an electric power circuit 40 and supply the electric power circuit 40 with electric power. Moreover, the battery 43 is charged as required by the electric power supplied from the electric power circuit 40.

The generator 41 has its operating state controlled, thereby having its electric power generation adjusted. In this regard, when the vehicle is decelerated, the generator 41 regenerates electric power on the basis of a rotational force transmitted to the engine 10 from the wheels 15 via the transmission 12 and the rest.

Moreover, this electric power circuit 40 has electric loads connected thereto, the electric loads including the electrically operated pump 22, the inverter 32 for the compressor, a load 42, and auxiliaries. These electric loads have electric power supplied thereto through the electric power circuit 40.

The present system has an energy control device 51, an engine control device 52, a generator control device 53, and an air-conditioning control device 54. Each of these control devices 51 to 54 is mainly constructed of a microcomputer made of a CPU, a ROM, a RAM and the rest and performs various controls by executing various control programs stored in the ROM.

The energy control device 51 controls the electrically operated pump 22, the blower fan 24, and the heat pump control device 38 through the air-conditioning control device 54. Further, the energy control device 51 controls the operating state of the generator 41 through the generator control device 53. Still further, the energy control device 51 controls the operating state of the engine 10 through the engine control device 52.

The present system has an A/C switch 61 for turning on/off an air conditioner, a temperature control switch 62 that a driver uses so as to set a target value of temperature in the cabin (target temperature), a cabin temperature sensor 63 for detecting temperature in the cabin, an ambient air temperature sensor 64 for detecting the temperature of the ambient air, and a blow-off outlet temperature sensor 65 for detecting the temperature of the air-conditioned air (the blow-off outlet temperature) sent into the cabin via an air blow-off outlet from the heater core 23 or the indoor heat exchanger 37, and the rest. Moreover, the quantity of the air-conditioned air is detected by a sensor or is calculated from a control value. The signals of these various sensors are inputted as required to the air conditioning control device 54.

The engine control device 52 performs various controls of the engine 10 according to the operating state of the engine 10. The present system has a revolution speed sensor 67 for detecting the revolution speed of the engine 10, an engine load sensor 68 for detecting the load of the engine 10 such as an intake air quantity or a negative pressure in an intake pipe, a water temperature sensor 69 for detecting the temperature of the coolant in the water jacket, and a vehicle speed sensor 66 for detecting the speed of the vehicle. The detection signals of these respective sensors are inputted as required to the engine control device 52.

The engine control device 52 has the detection signals inputted thereto from the various kinds of sensors described above, and on the basis of these detection signals inputted thereto, the engine control device 52 performs a fuel injection control by a fuel injection valve, an ignition timing control by an ignition unit, a valve timing control by valve drive mechanisms on an intake side and an exhaust side, and an intake air quantity control by a throttle valve.

Basically, an engine shaft efficiency (fuel consumption rate) is different among the various kinds of controls according to the operating state of the engine 10. In view of this point, the various kinds of controls are performed on the basis of adequate data and the rest in such a way that the engine shaft efficiency is maximized in the operating state at that time.

Here, in the present system, in the case where the quantity of generation of waste heat (generated heat power) that is the thermal energy of the engine 10 is increased, a control of increasing a generated heat power (heat generation control) is performed in such a way that a fuel increment caused by an increase in the waste heat is minimized. As for the heat generation control, specifically, the present control system has a plurality of waste heat control units of the engine 10 so as to increase the generated heat power. When a request of utilizing heat such as a heating request is made, the present control system determines a combination of the waste heat control unit in such a way that the heat cost of all of the plurality of waste heat control units is minimized.

The heat generation control will be described in more detail. In the present system, the quantity of waste heat of the engine is increased by utilizing one or a plurality of the followings: for example, (1) the quantity of waste heat is increased by delaying an ignition timing;
(2) the quantity of waste heat is increased by changing the valve opening timing of an intake valve to an advance side (by opening an intake valve earlier); and
(3) the quantity of waste heat is increased by changing the valve opening timing of an exhaust valve to a delay side (by opening an exhaust valve later).

Further, as the waste heat power control unit of the engine 10, the present embodiment has, for example, (1) a unit for opening the exhaust valve later;
(2) a unit for opening the intake valve earlier; and
(3) a unit for delaying an ignition timing.

Figure 3:
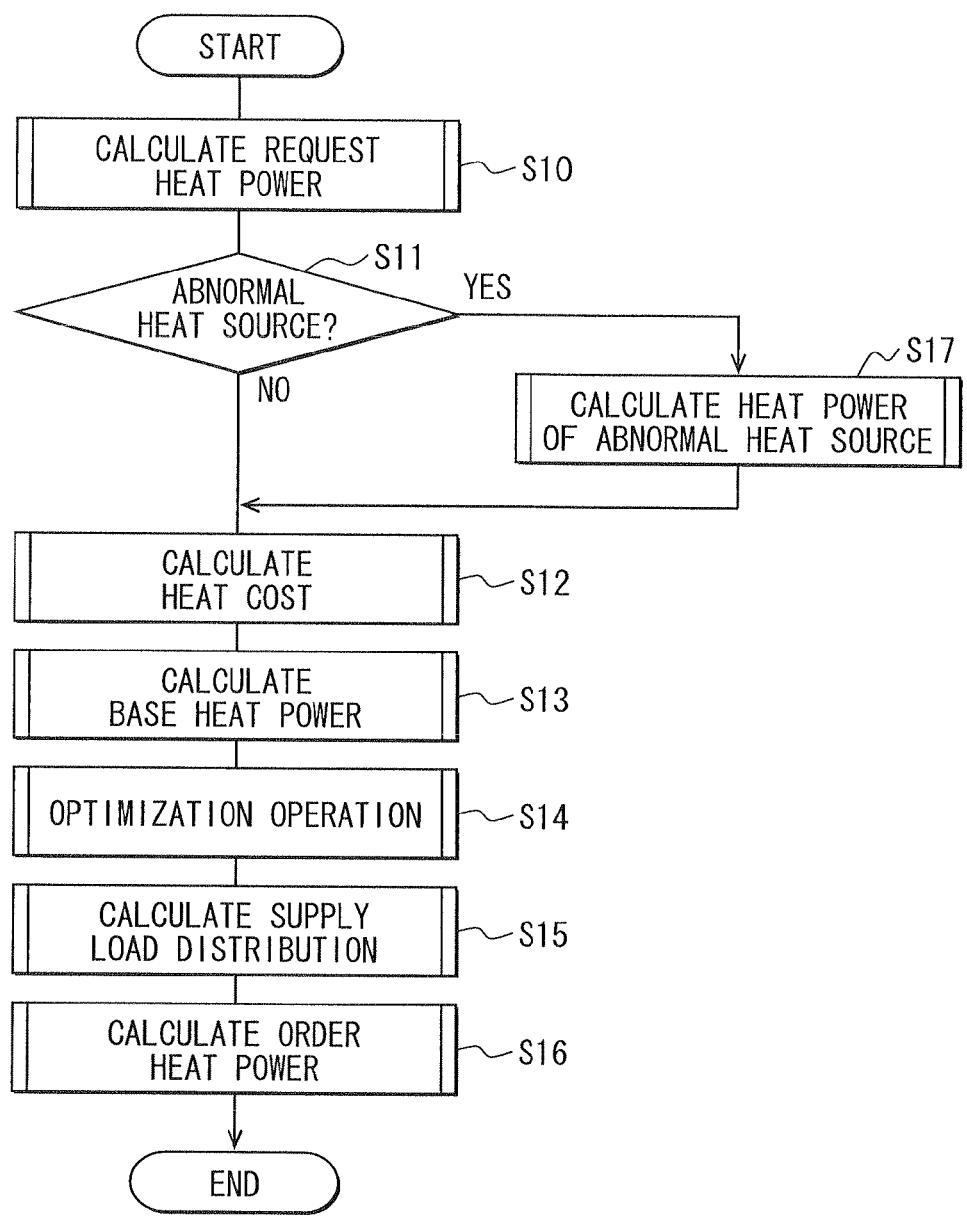
FIG. 3 is a flow chart to show a processing procedure of heat supply control.

A processing procedure of a heat supply control by the present system will be shown in FIG. 3. This processing is repeatedly performed at specified intervals. In this regard, the details of the processing in each step of this heat supply control will be described later.

First, according to a heating request of a driver, the air-conditioning control device 54 calculates a request heat power, which is requested to be supplied to the heat exchange part from the plurality of heat sources, that is, a heat power to be supplied to the heat exchange part from the plurality of heat sources (S10). The air-conditioning control device 54 sends this request heat power to the energy control device 51.

Subsequently, the energy control device 51 determines whether or not an abnormal heat source that cannot normally supply heat is in the plurality of heat sources (S11). Then, in the case where the energy control device 51 determines that an abnormal heat source that cannot normally supply heat is in the plurality of heat sources (S11: YES), the energy control device 51 calculates an abnormal heat power that is a heat power that the abnormal heat source supplies (S17). Thereafter, the energy control device 51 performs the processings of the step S12 and subsequent steps. On the other hand, in the determination described above, when the energy control device 51 determines that an abnormal heat source that cannot supply heat normally is not in the plurality of heat sources (S11: NO), the energy control device 51 does not perform the processing in the step S17 but performs the processings of the step S12 and subsequent steps.

Subsequently, the energy control device 51 calculates a heat cost of each of the plurality of heat sources (S12). At this time, the energy control device 51 calculates a heat cost of the heat pump system 30 from a heat power to be supplied and a fuel quantity consumed so as to supply electric power to be used. The heat power consumed so as to supply electric power to be used can be found in advance by an experiment or the like.

Subsequently, the energy control device 51 calculates a base heat power that is a heat power that each of the plurality of heat sources can supply in the state where a heat cost is zero (state where a fuel quantity consumed to supply heat is zero) (S13). The energy control device 51 finds a fuel quantity consumed so as to supply heat in each of the heat sources as a function of heat power on the basis of the heat cost of each of the heat sources. Then, on the basis of this function (fuel quantity), the energy control device 51 calculates a heat power relationship that is a relationship between a heat power to be supplied and a fuel to heat increment (heat power increment fuel quantity), which is a differential value obtained by differentiating this function (fuel quantity) with respect to the heat power. Further, on the basis of this heat power relationship, the energy control device 51 performs an optimization operation in such a way that a fuel quantity consumed in all of the plurality of heat sources so as to supply the heat is minimized (S14).

Here, there are a case where an abnormality is caused in the communications between constituent components in the energy control device 51 or in the communications between the energy control device 51 and the other devices, a case where a processing load of calculating a heat power to be supplied is excessively increased by an increase in the revolution speed of the engine 10, a case where electric power cannot be normally supplied from the battery 43, and a case where the magnitude of the heat power supplied from the heat source is out of a normal range. In these cases, the heat power to be supplied from the heat source cannot be calculated or a normal heat power cannot be supplied from the heat source, so that the fuel quantity to be consumed cannot be controlled in the abnormal heat source like this.

For this reason, in the present embodiment, the optimization calculation described above is performed in such a way that the sum total of the heat power supplied from the plurality of heat sources including the abnormal heat source described above is equal to the request heat power described above and that the fuel quantity consumed in all of the plurality of heat sources except for the abnormal heat source is minimized. In more detail, the heat power obtained by subtracting the abnormal heat power from the request heat power is made to be supplied to the heat exchange part from the plurality of heat sources except for the abnormal heat source, and a distribution of heat power supplied from the plurality of heat sources is determined in such a way that the heat cost of all of the plurality of heat sources except for the abnormal heat source is minimized.

Subsequently, on the basis of the result of this optimization calculation, the base heat power of the respective heat sources are distributed to the respective heat sources for the request heat power, and a remaining request heat power that is a remainder of the request heat power is distributed as an additional request heat power to the respective heat sources (S15). Thereafter, an order heat power for each of the heat sources is calculated for each of the heat sources as the sum of the distributed base heat power and the distributed remaining request heat power (S16).

Then, the energy control device 51 sends the order heat power for the respective heat sources to the air-conditioning control device 54 and the engine control device, and the air-conditioning control device 54 and the engine control device control the respective heat sources in such a way that these order heat power are supplied by the respective heat sources.

Figure 4:
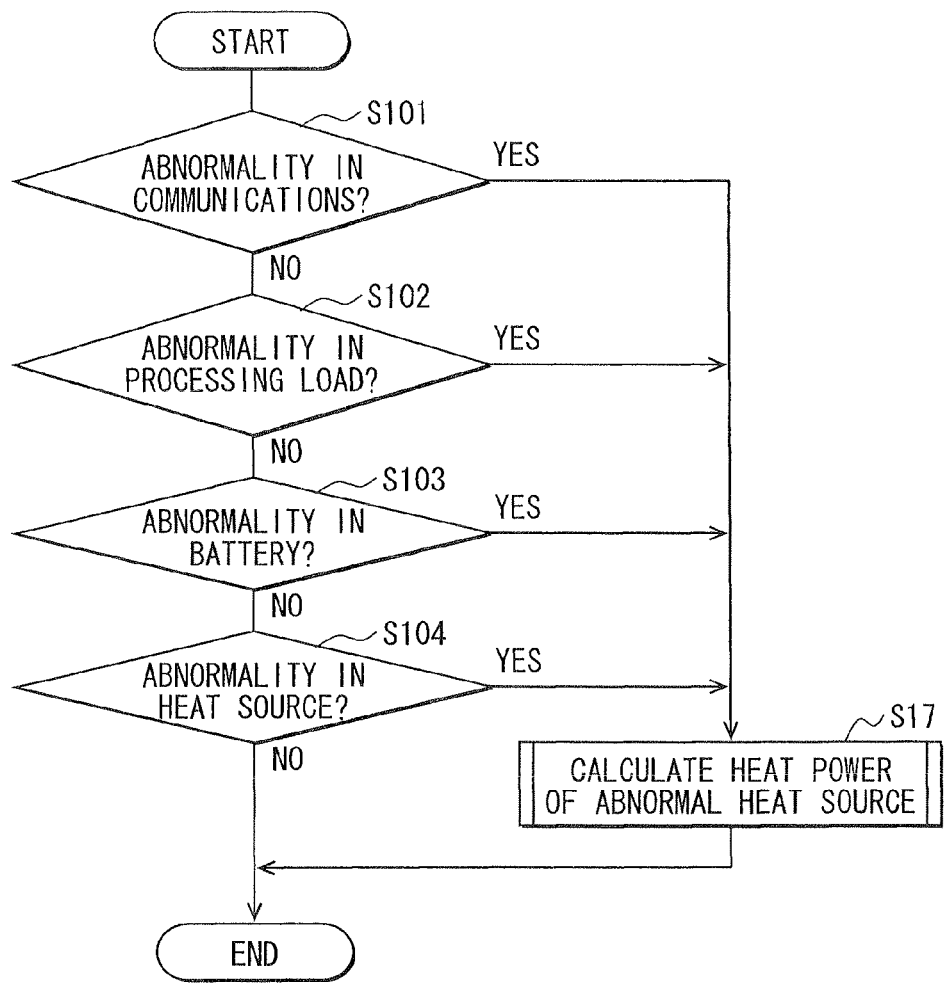
FIG. 4 is a flow chart to show a processing procedure of detecting an abnormal heat source and of calculating an abnormal heat power.
Figure 13:
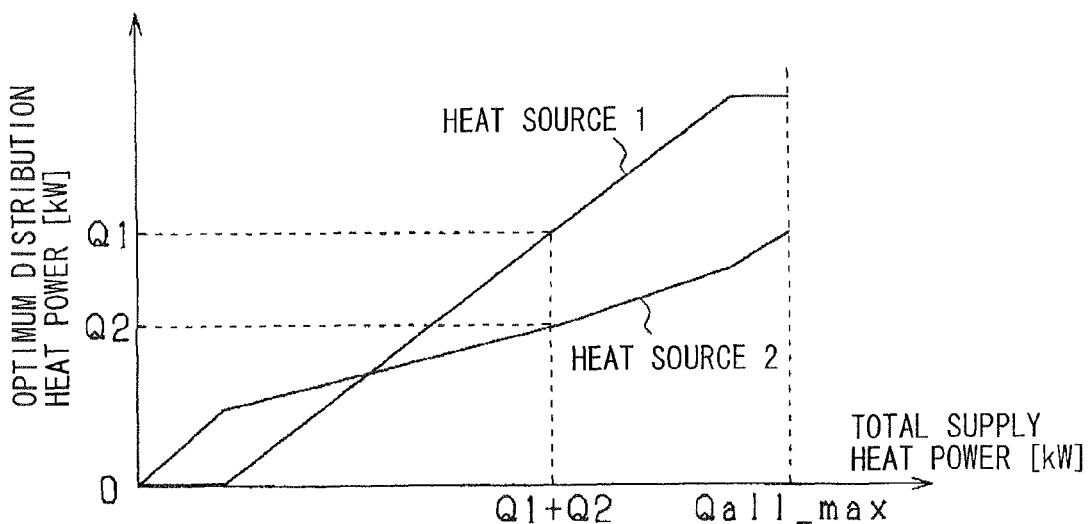
FIG. 13 is a graph to show a relationship between a total supply heat power and an optimum distribution heat power.

FIG. 4 is a flow chart to show a processing procedure of detecting the abnormal heat source described above (S11 in FIG. 3) and calculating an abnormal heat power (S17 in FIG. 13). This series of processings are performed by the energy control device 51.

First, it is determined whether or not an abnormality is caused in the communications between the energy control device 51 and the other devices (S101). Specifically, it is determined whether or not an abnormality is caused in the communications between the energy control device 51 and the generator control device 53 or the air conditioning control device 54. As for the abnormality in the communications, there are the state where the communications are stopped for a time longer than a specified time and the case where the value of a communication signal is abnormal. In this regard, this determination processing corresponds to a processing as an abnormal heat source detection unit.

If it is determined in the above-mentioned determination that an abnormality is caused in the communications between the energy control device 51 and the other devices (S101: YES), an abnormal heat power is calculated on the basis of the sum total of an actual heat power (actual heat power) Qreal, which is the sum total of the heat power actually supplied to the heater core 23 and the indoor heat exchanger 37 from the plurality of heat sources, and the heat power, which is supplied to the heater core 23 and the indoor heat exchanger 37 from the heat sources except for the abnormal heat source (S17). Here, this processing corresponds to a processing as an abnormal heat power calculation unit.

Specifically, a heat power to be supplied into the cabin is calculated on the basis of the detection value of the cabin temperature sensor 63, the detection value of the blow-off outlet temperature sensor 65 for detecting the temperature of the air-conditioned air sent into the cabin, and the air volume of the blower fan 24 for sending the air-conditioned air into the cabin. Then, on the basis of the heat power to be supplied into the cabin, the actual heat power Qreal is calculated which is the sum total of the heat power to be actually supplied to the heater core 23 and the indoor heat exchanger 37 from the plurality of heat sources except for the abnormal heat source. Further, the abnormal heat power is calculated by subtracting the sum total of the heat power to be supplied to the heater core 23 and the indoor heat exchanger 37 from the heat sources except for the abnormal heat source from this actual heat power Qreal. The heat power to be supplied to the heater core 23 and the indoor heat exchanger 37 from the heat sources except for the abnormal heat source can be calculated from the order heat power for the respective heat sources which the energy control device 51 sends to the air-conditioning control device 54 and the engine control device 52. Thereafter, this series of processings are once ended and then the procedure proceeds to the processing of S12 in FIG. 3.

On the other hand, if it is determined in the above-mentioned determination that an abnormality is not caused in the communications between the constituent components in the energy control device 51 and in the communications between the energy control device 51 and the other devices (S101: NO), it is determined whether or not an abnormality is caused that a processing load of calculating the heat power to be supplied from the heat source becomes excessively large (S102). Specifically, in the case where it is detected on the basis of the detection value of the revolution speed sensor 67 that the revolution speed of the engine 10 is higher than a specified value, it is determined that an abnormality is caused that the processing load becomes excessively large. In other words, in the case where the revolution speed of the engine 10 is higher than the specified value (in the case of high revolution speed), the processing load of calculating the heat power to be supplied from the above-mentioned waste heat control unit (1), (2), and (3) becomes excessively large. Here, the processing of determining whether or not the abnormality is caused that this processing load becomes excessively large corresponds to the processing as the abnormal heat source detection unit.

In the case where it is determined in the determination described above that the abnormality is caused that the processing load of calculating the heat power to be supplied from the heat source becomes excessively large (S102: YES), and if the water temperature of the engine 10 is higher than a specified temperature (for example, a warming-up finish temperature), only the heat power of the coolant of the engine 10 is used as the heat source. Subsequently, if the water temperature of the engine 10 is not higher than the specified temperature, only the heat pump system 30 is used as the heat source (S17). In other words, either of the abnormal heat power to be supplied from the heat pump system 30 (abnormal heat source) and the abnormal heat power to be supplied from the coolant (abnormal heat source) is set to zero. In this regard, this processing corresponds to the processing as the abnormal heat power calculation unit. Thereafter, this series of processings are once ended and then the procedure proceeds to the processing of S12 in FIG. 3.

On the other hand, in the case where it is determined in the determination described above that the abnormality is not caused that the processing load of calculating the heat power to be supplied from the heat source becomes excessively large (S102: NO), and it is determined whether or not an abnormality is caused that electric power cannot be normally supplied from the battery 43 (S103). Specifically, it is determined whether or not the remaining power of the battery 43 is smaller than a specified power and whether or not the temperature of the battery 43 is out of a specified range. That is, due to the remaining power of the battery 43, in the case where while the engine 10 stops idling, the engine 10 needs or may need to be started so as to charge the battery 43. In this case, it is determined that the abnormality is caused that electric power cannot be normally supplied from the battery 43. Further, in the case where the temperature of the battery 43 is lower than a specified temperature in which the loss of charge or discharge becomes large, or in the case where the temperature of the battery 43 is higher than a specified temperature in which the battery 43 may be damaged, it is determined that the abnormality is caused that electric power cannot be normally supplied from the battery 43. In this regard, these processings correspond to the processing as the abnormal heat source detection unit.

In the case where it is determined in the determination described above that the abnormality is caused that electric power cannot be normally supplied from the battery 43 (S103: YES), only the coolant of the engine 10 is used as the heat source on the condition that the water temperature of the engine 10 is higher than a specified temperature (for example, warming-up finish temperature) (S17). In other words, an abnormal heat power to be supplied from the heat pump system 30 (abnormal heat source) is set to zero. This processing corresponds to the processing as the abnormal heat power calculation unit. Further, in the case where the water temperature of the engine 10 is not higher than a specified temperature, it is required to refrain from using the coolant as a heat source until the water temperature becomes higher than the specified temperature. Thereafter, this series of processings are once ended and the procedure proceeds to the processing of S12 in FIG. 3.

On the other hand, in the case where it is determined in the determination described above that the abnormality is not caused that the electric power cannot be normally supplied from the battery 43 (S103: NO), it is determined whether or not the magnitude of heat power to be supplied from the heat source is abnormal (S104). Specifically, it is determined whether or not a difference between a heat power to be supplied into the cabin from the heater core 23, which is calculated on the basis of the temperature of the coolant, and a heat power to be supplied into the cabin, which is calculated from the information of the air-conditioned air, is larger than a specified degree. in addition, it is determined whether or not a difference between a heat power to be supplied into the cabin from the indoor heat exchanger 37, which is calculated on the basis of operating state of the heat pump system 30, and a heat power to be supplied into the cabin, which is calculated from the information of the air-conditioned air, is larger than a specified degree. In other words, in the case where the difference (difference or ratio) between the heat power to be supplied into the cabin, which is calculated on the basis of the temperature of the coolant, and the heat power to be supplied into the cabin, which is calculated from the information of the air-conditioned air, is larger than the specified degree, it is determined that the magnitude of the heat power to be supplied from the coolant (abnormal heat source) is abnormal. On the other hand, in the case where the difference (difference or ratio) between the heat power to be supplied into the cabin, which is calculated on the basis of the operating state of the heat pump system 30, and the heat power to be supplied into the cabin, which is calculated from the information of the air-conditioned air, is larger than the specified degree, it is determined that the magnitude of the heat power to be supplied from the heat pump system 30 (abnormal heat source) is abnormal. In this regard, these processings correspond to the processing as the abnormal heat source detection unit.

In the case where it is determined in the determination described above that the magnitude of the heat power to be supplied from the heat source is abnormal (S104: YES), an abnormal heat power is calculated on the basis of: the actual heat power Qreal, which is the sum total of the heat power to be actually supplied to the heater core 23 and the indoor heat exchanger 37 from the plurality of heat sources; and the heat power to be supplied to the heater core 23 and the indoor heat exchanger 37 from the plurality of heat sources except for the abnormal heat source (S17). In this regard, this processing corresponds to the processing as the abnormal heat power calculation unit.

Specifically, as described above, the heat power to be supplied into the cabin is calculated on the basis of the detection value of the cabin temperature sensor 63, the detection value of the blow-off outlet temperature sensor 65 for detecting the temperature of the air-conditioned air sent into the cabin, and the air volume of the blower fan 24 for sending the air-conditioned air. The actual heat power Qreal, which is the sum total of the heat power to be actually supplied to the heater core 23 and the indoor heat exchanger 37 from the plurality of heat sources, is calculated on the basis of the heat power to be supplied into the cabin. Further, the abnormal heat power is calculated by subtracting the sum total of the heat power, which is to be supplied to the heater core 23 and the indoor heat exchanger 37 from the plurality of heat sources except for the abnormal heat source, from this actual heat power Qreal. Thereafter, this series of processings are once ended and the procedure proceeds to the processing of S12 in FIG. 3.

Next, the details of the respective processings of S10 and S12 to S16 in the heat supply control described above will be described below.

Figure 5:
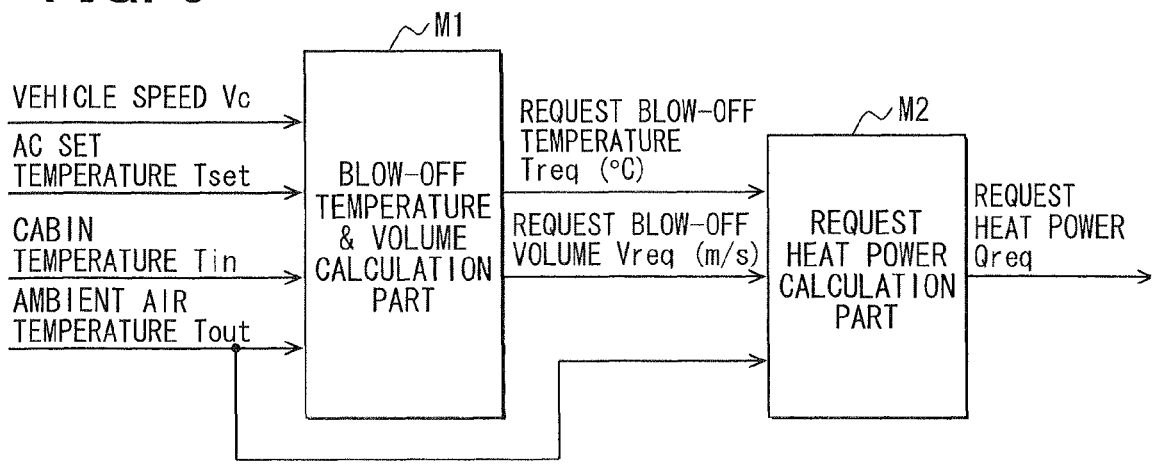
FIG. 5 is a function block diagram for calculating a request heat power.

FIG. 5 is a function block diagram for calculating the request heat power Qreq in the step of S10 in FIG. 3. The air-conditioning control device 54 has a blow-off outlet temperature & air volume calculation part M1 and a request heat power calculation part M2.

By the use of a data map or the like, the blow-off outlet temperature & air volume calculation part M1 calculates a requested value of temperature at a blow-off outlet of an air conditioner (requested blow-off outlet temperature Treq) and a requested value of air volume at the blow-off outlet of the air conditioner (requested blow-off air volume Vreq) by using a vehicle speed Vc detected by the vehicle speed sensor 66, an air-conditioner setting temperature Tset set by the temperature control switch 62, a cabin temperature Tin detected by the cabin temperature sensor 63, and an ambient air temperature Tout detected by the ambient air temperature sensor 64 as parameters.

By the use of a data map or the like, the request heat power calculation part M2 calculates the request heat power Qreq by using the requested blow-off outlet temperature Treq, the requested blow-off air volume Vreq and the ambient air temperature Tout, which are calculated by the blow-off outlet temperature & air volume calculation part M1, as parameters.

Next, the details of the processing of calculating the heat power of the plurality of heat sources in the step S12 in FIG. 3 will be described.

Figure 6:
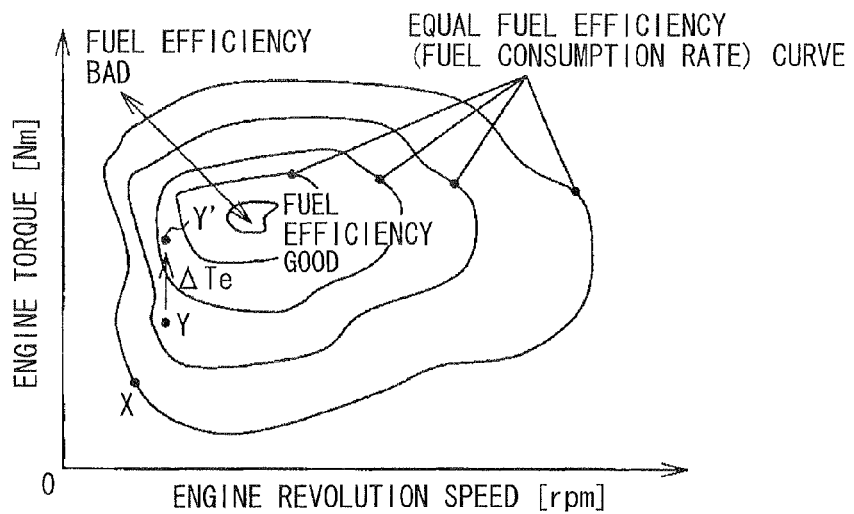
FIG. 6 is a data map to show a relationship between an operating point of an engine and a fuel consumption rate.

One example of a data map to illustrate a relationship between the operating state of the engine 10 and a fuel consumption rate will be shown in FIG. 6. In the drawing, an engine revolution speed and an engine torque are shown as the operating state of the engine 10.

In this system, of the energy generated by the combustion of the fuel in the engine 10, the thermal energy is recovered and reused by using the coolant of the engine 10 as a medium, whereby the fuel consumption of the whole system is improved.

For example, in the case where a heat use request is made while the engine is driven at the best point of an engine shaft efficiency and the request heat power Qreq is increased according to the heat use request, when a heat power to be generated at the best point of the engine shaft efficiency cannot satisfy the request heat power Qreq, the heat generation control of the engine 10 is performed so as to make up for a shortage in the heat power to be generated.

Figure 7:
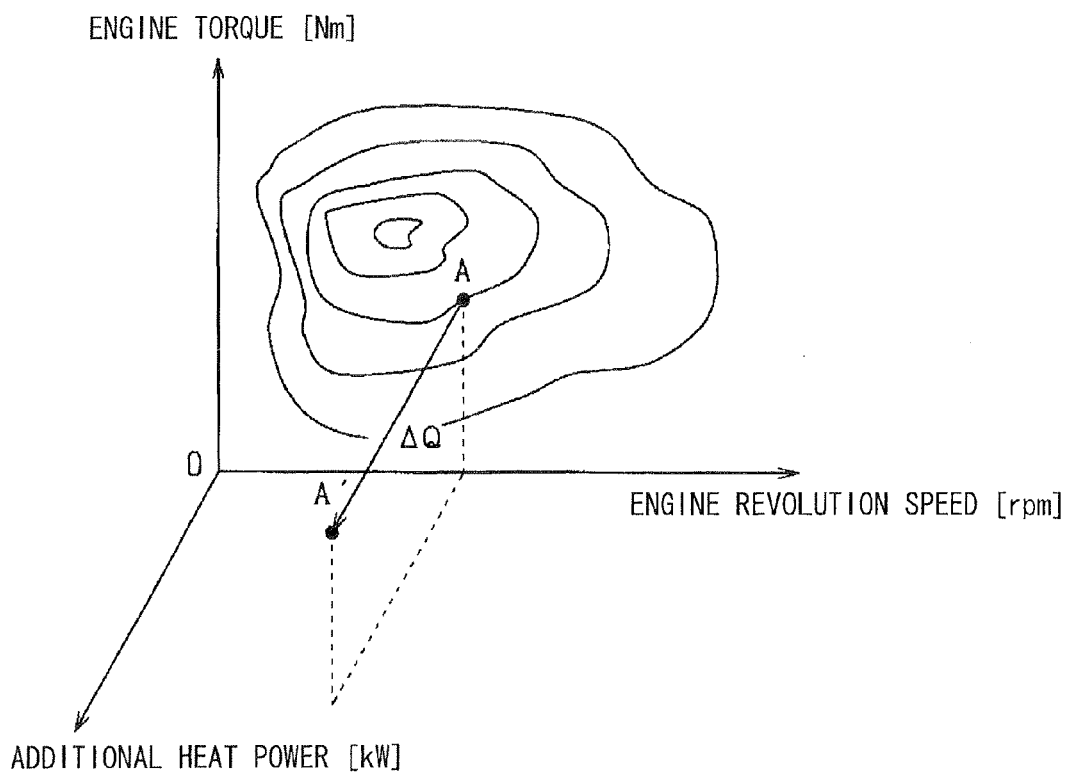
FIG. 7 is a drawing to show a relationship between an operating point of an engine and an additional heat power.

In this case, in order to satisfy the request heat power Qreq, for example as shown in FIG. 7, by shifting the operating point of the engine 10 from the best point A of the engine shaft efficiency to a point A' different from the best point A by the use of the waste heat power control unit, the waste heat of the engine 10 needs to be increased by a heat power ΔQ from the heat power (additional heat power=0) generated at the best point A of the engine shaft efficiency. When the operating point of the engine 10 is shifted from the point A to the point A' in this way, the operating point of the engine 10 is shifted to a fuel increase side (fuel consumption degrade side) from the best point A of the engine shaft efficiency, whereby a heat power increment (additional heat power ΔQ) is generated which is an increment with respect to the heat power (base heat power) generated at the best point A of the engine shaft efficiency.

Figure 8:
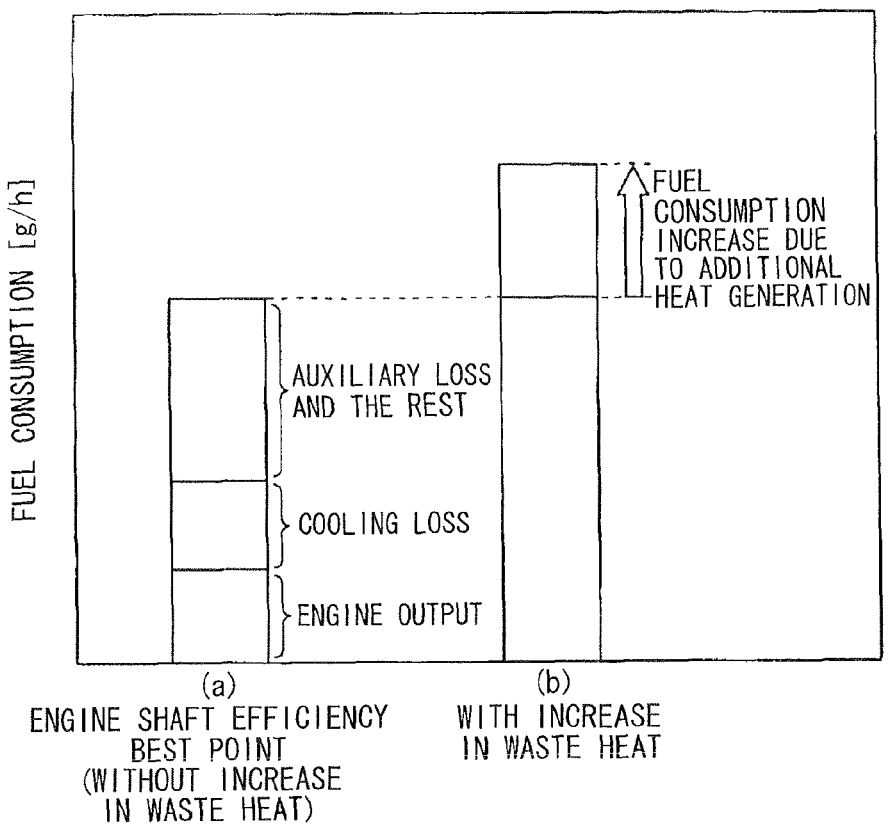
FIG. 8 is a graph to show fuel increment caused by the generation of the additional heat power.

FIG. 8 is a graph to illustrate a fuel consumption when an additional heat power is generated according to the heat use request. In the drawing, (a) shows a fuel consumption [g/h] when the engine 10 is operated at the best point A of the engine shaft efficiency, and (b) shows a fuel consumption [g/h] when the operating point of the engine 10 is shifted from the best point A of the engine shaft efficiency to the point A'.

At the best point A of the engine shaft efficiency, of the fuel combustion energy of the engine 10, for example, about 25% is transformed (converted) to a shaft output of the engine 10 as kinetic energy and about 25% becomes a cooling loss and a remainder becomes the other loss such as an auxiliary loss and an exhaust loss. The thermal energy of the cooling loss is recovered by using the engine coolant as a medium and the recovered heat is used for, e.g., heating the interior of the cabin and for warming up the engine 10.

When the request heat power Qreq is increased according to the heat use request, in the case where the request heat power Qreq cannot be satisfied only by the cooling loss at the best point A of the engine shaft efficiency, a heat power of the shortage is generated as an additional heat power by the engine heat generation control. At this time, the fuel consumption is increased according to the generation of the additional heat power, but from the viewpoint of inhibiting the fuel consumption from becoming worse, it is desired that an increase in the fuel quantity, which is caused by the generation of the additional heat power, is made as small as possible. Thus, at the time of generating the additional heat power of an equal quantity, the heat generation control determines a combination of the waste heat control unit (1), (2), and (3) that can minimize a fuel increment to thereby control the generation of the additional heat power.

Further, according to the findings of the inventors of this application, in the case where a desired quantity of waste heat of the engine is generated, a fuel increment required to generate the desired quantity of waste heat is changed according to the operating point of the engine when the heat power starts to be increased (operating state of the engine 10). For example, in the case where the request heat power Qreq cannot be satisfied when the engine 10 is controlled at the best point of the engine shaft efficiency, the heat power generated by the engine 10 needs to be increased to make up for a shortage in the request heat power Qreq.

At this time, a fuel increment required to increase an equal quantity of waste heat of the engine is different between in the case where the operating point of the engine when the heat power starts to be increased is the operating point X in FIG. 6 and in the case where the operating point of the engine when the heat power starts to be increased is the operating point Y different from the operating point X. In other words, a fuel increment (fuel increase rate) with respect to the heat power generated by the engine is different according to the operating point of the engine when the heat power starts to be increased. Further, the fuel increase rate is different according to not only the operating point of the engine but also the ambient air temperature and the rest.

The fuel increase rate will be further described. The fuel increase rate is a parameter related to fuel consumption when the heat power (waste heat power) supplied to the coolant from the engine 10 as the heat source is increased. Specifically, the fuel increase rate is a ratio between a heat power increment (additional heat power $\Delta Q$) generated by the engine heat generation control and an increment in the fuel injection quantity (fuel increment $\Delta F$) when the waste heat control unit are used in combination in such a way as to minimize a fuel increment in the case where the additional heat power $\Delta Q$ is generated. For example, a heat cost, which is a fuel quantity consumed to supply a unit heat power, can be employed as one of the fuel increase rate.

Fuel consumption $Ct$ [g/kWh]=fuel increment $\Delta F$ [g/h]/additional heat power $\Delta Q$ [kW]

Figure 9:
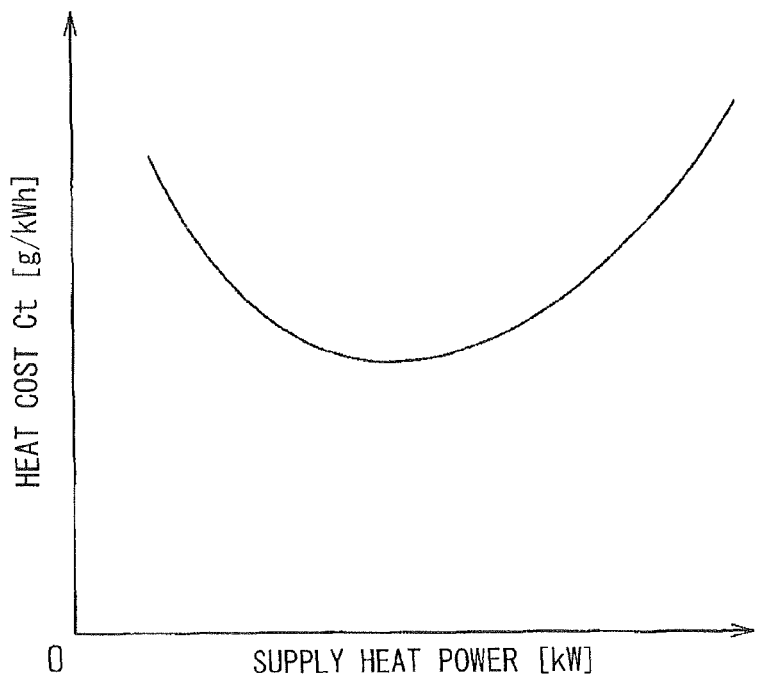
FIG. 9 is a heat cost characteristic curve to show a relationship between a supply heat power and a heat cost.

FIG. 9 is a fuel consumption characteristic curve to show a relationship of the heat cost Ct to the additional heat power $\Delta Q$ (heat power to be supplied) at the operating point X of the engine (see FIG. 6). This fuel consumption characteristic curve may be calculated in advance on the basis of an experiment and the rest or may be calculated in each case on the basis of a model or the like, In this regard, this processing corresponds to a processing as a heat cost calculation unit. As shown in the drawing, the fuel consumption Ct is different according to the additional heat power $\Delta Q$: for example, the heat cost characteristic at the operating point X of the engine has a minimum point within a setting range of the additional heat power $\Delta Q$.

The relationship of the heat cost Ct to the additional heat power $\Delta Q$ is different for each operating point of the engine: for example, in the case where an additional heat power Q1 of a specified quantity is generated, the heat cost Ct is smaller at the operating point Y than that at the operating point X. For this reason, when the heat power generated by the engine 10 is increased by the additional heat power Q1, a fuel increment is smaller in the case where the operating point of the engine at the time of starting to increase the heat power is Y than that in the case the operating point of the engine at the time of starting to increase the heat power is X. In other words, when the heat power generated by the engine 10 is increased, the thermal energy of the engine 10 can or cannot be generated efficiently in cases in viewpoint of the fuel consumption. Thus, in the present system, the heat cost characteristic curve described above is calculated according to the operating point of the engine (operating state of the engine 10).

Moreover, the present system has the heat pump system 30 (electrically operated heat source) as a heat source in addition to the waste heat power control unit (engine heat source). For this reason, the heat cost characteristic curve is calculated also for the heat pump system 30.

Next, the details of the processing of calculating the base heat power of the respective heat sources in S13 in FIG. 3 will be described.

In the engine heat source of the waste heat power control unit and the rest, as shown in FIG. 8, in the case where the engine 10 is operated at the best point of the engine shaft efficiency, the thermal energy to become the cooling loss is made the base heat power. The energy control device 51 receives the information of the engine operating state and the rest from the engine control device 52 and calculates this base heat power on the basis of the engine operating state and the rest.

In the electrically operated heat source such as the heat pump system 30, a maximum heat power that can be generated by the electric power supplied by the power regeneration of the generator 41 while the vehicle is decelerated is made the base heat power. At this time, the energy control device 51 receives the information of the engine operating state and the rest from the engine control device 52 and calculates the base heat power on the basis of the engine operating state and the rest.

Then, the energy control device 51 adds up the base heat power of the respective heat sources to calculate the total base heat power Qbas_all of the all heat sources.

Next, in S14 in FIG. 3, the details of the processing of performing an optimization operation in such a way that the fuel quantity consumed in the all heat sources so as to supply heat is minimized will be described.

The energy control device 51 calculates fuel consumption F corresponding to each of a plurality of points of heat power Q supplied by each of the heat sources on the basis of the heat cost characteristic curve of each of the heat sources. Specifically, each fuel consumption F is calculated by the following equation.

Fuel consumption $F$=heat cost $Ct$×heat power $Q$

Then, the fuel consumption is approximated by a quadratic function by a least square method or the like on the basis of a plurality of data of the heat power Q and the fuel consumption F. That is, the fuel consumption F is expressed by a quadratic function of the heat power Q to be supplied. The relationship between the heat power Q and the fuel consumption F is different among the respective heat sources. In this regard, generally, the fuel consumption F can be approximated by a quadratic to quartic function of the heat power Q to be supplied.

Here, the request heat power Qreq is supplied from the plurality of heat sources, and the supply load distribution of the respective heat sources to minimize the fuel quantity consumed in all of the plurality of heat sources can be found by solving the following optimization problem. That is, when it is assumed that a total request heat power is Qall, the heat power to be supplied from the respective heat sources are Q1, Q2, . . . , Qn, and the fuel quantities consumed at that time are F1, F2, . . . , Fn, and Constraint condition: Qall=Q1+Q2+ . . . +Qn
Object function: f=F1(Q1)+F2(Q2)+ . . . +Fn(Qn), the above problem is replaced by a problem of finding the supply load distribution of the respective heat sources to minimize a total fuel quantity consumption f. An optimum solution of this problem can be found by Lagrange's undetermined multipliers in the following manner.

An original problem of
Object function: f(x1, x2, . . . , xn)
Constraint condition:

$g1(x1, x2, \ldots, xn) = 0$ $g2(x1, x2, \ldots, xn) = 0$ $g3(x1, x2, \ldots, xn) = 0$ -continued $$\vdots$$
$$gm(x1, x2, \ldots, xn) = 0$$

Decision variable: x1, x2, . . . , xn
is converted to a problem having no constraint condition, which will be described below, by introducing new variables $\lambda 1, \lambda 2, \ldots, \lambda m$ (Lagrange multipliers).
Object function: L(x1, x2, . . . , xn, $\lambda 1, \lambda 2, \ldots, \lambda m$)
Decision variable: x1, x2, . . . , xn, $\lambda 1, \lambda 2, \ldots, \lambda m$
where L is called a Lagrangian function and is defined by the following equation.

[Mathematical equation 1]

$$L(x1,x2,\ldots,xn,\lambda 1,\lambda 2,\ldots,\lambda m) = f(x1,x2,\ldots,xn) + \lambda 1 g1(x1,x2,\ldots,xn),\ldots,+\lambda m gm(x1,x2,\ldots,xn)$$

In general, a necessary condition for the decision variables x1, x2, xn to be optimum solutions of the problem described above is expressed by the following equation.

[Mathematical equation 1]

$$\frac{dL}{dx1} = 0, \ldots, \frac{dL}{dxn} = 0, \ldots, \frac{dL}{d\lambda 1} = 0, \ldots, \frac{dL}{d\lambda m} = 0$$

When this model is applied to the problem of the supply load distribution of the respective heat sources described above, the Lagrangian function is defined by the following equation.

[Mathematical equation 2]

$$L = \sum_{i=1}^{n} Fi(Qi) + \lambda \left( Qall - \sum_{i=1}^{n} Qi \right)$$

A necessary condition for an optimum solution is that the solutions obtained by first differentiating the formula 2 described above with respect to the heat power Qi of the respective heat sources and the Lagrange multiplier X are 0, respectively. In other words, heat power Q1, Q2, . . . , Qn satisfying the following mathematical equations 3, 4 are the optimum solutions of the problem.

[Mathematical equation 3]

$$\frac{dL}{dQi} = \frac{dFi}{dQi} - \lambda = 0 \; (i = 1, \ldots, n)$$

[Mathematical equation 4]

$$\frac{dL}{d\lambda} = Qall - (Q1 + Q2 + \ldots + Qn) = 0$$

The mathematical equation 4 described above is the constraint condition itself and hence the optimum solutions can be found as solutions satisfying the following mathematical equation.

[Mathematical equation 5]

$$\lambda = \frac{dF1}{dQ1} = \frac{dF2}{dQ2} = \ldots = \frac{dFn}{dQn}$$

where dF/dQ is a value to show how much the consumed fuel quantity is increased when the heat power supplied from the heat source is increased by a small quantity, and it is assumed to call the dF/dQ a fuel to heat increment. The above mathematical equation means that when this fuel to heat increment is equal for the all heat sources, that is, when the values of the fuel to heat increment of the respective heat sources are equal to each other, the fuel quantity consumed in all of the plurality of heat sources is minimized. This principle is generally referred to as an equal $\lambda$ rule.

Figure 10:
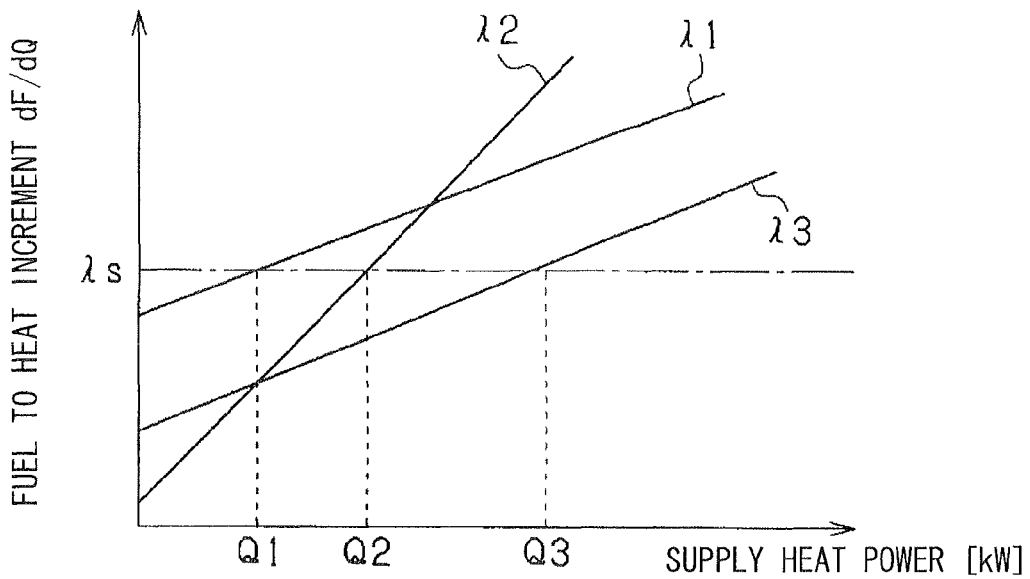
FIG. 10 is a graph to show a relationship between a supply heat power and a fuel to heat increment.

FIG. 10 is a graph to show a relationship between a supply heat power Q and a fuel to heat increment dF/dQ. Here, it is assumed that the values of the fuel to heat increment dF/dQ of the heat sources 1, 2, 3 have characteristics $\lambda 1, \lambda 2, \lambda 3$, respectively. At this time, the fuel consumption F is approximated by the quadratic function (aQ²+bQ+c) of the heat power Q, so that when this function is differentiated once with respect to the heat power Q, a linear function (2aQ+b) is obtained. In this regard, it is assumed to call this relationship between the supply heat power Q and the fuel to heat increment dF/dQ a heat power relationship. A processing of calculating this heat power relationship corresponds to a processing as a heat power relationship calculation unit.

In the drawing, when a straight line parallel to a horizontal axis with a specified $\lambda_s$ assumed, the intersections of this straight line and the values of the fuel to heat increment of the respective heat sources can be found. At this time, at the respective intersections, the values of the fuel to heat increment are equal to each other and hence the mathematical equation 5 described above is satisfied. Thus, if the sum total of the supply heat power Q1, Q2, Q3 at the respective intersections is equal to the total request heat power Qall, the mathematical equation 4 described above is satisfied at the same time. In other words, it is only necessary to find a position at which the sum total of the supply heat power Q1, Q2, Q3 at the respective intersections is equal to the total request heat power Qall by changing the value of $\lambda_s$ to move up and down the straight line.

Moreover, in general, an upper limit value Qmax and a lower limit value Qmin exist in the heat power that each of the heat sources can supply. For this reason, when the values of the fuel to heat increment dF/dQ of the respective heat sources are changed in such a way as to be equal to each other, there are cases where a heat power corresponding to the fuel to heat increment reaches the upper limit value Qmax or the lower limit value Qmin in a part of the heat sources.

In this case, in the plurality of heat sources in which the heat power to supply does not reach the upper limit value Qmax and the lower limit value Qmin, in the case where the values of the fuel to heat increment of the respective heat sources are equal to each other, the fuel quantities consumed in these heat sources become minimum. On the other hand, in the heat source in which the heat power to supply reaches the upper limit value Qmax and the lower limit value Qmin, the fuel to heat increment is not always equal to the fuel to heat increment in the other heat sources. However, even in this case, the fuel quantity consumed in all of the plurality of heat sources is minimized.

Thus, the condition of the optimum solutions in the case of considering constraint by the upper limit value Qmax and the lower limit value Qmin of the heat power that each of the heat sources can supply is expressed by the following mathematical equations 6 to 8.

[Mathematical equation 6]

In the case where $\frac{dFi}{dQi} = \lambda s$   $Qi\,\text{min} \leq Qi \leq Qi\,\text{max}$

[Mathematical equation 7]

In the case where $\frac{dFi}{dQi} \leq \lambda s$   $Qi = Qi\,\text{max}$

[Mathematical equation 8]

Figure 11:
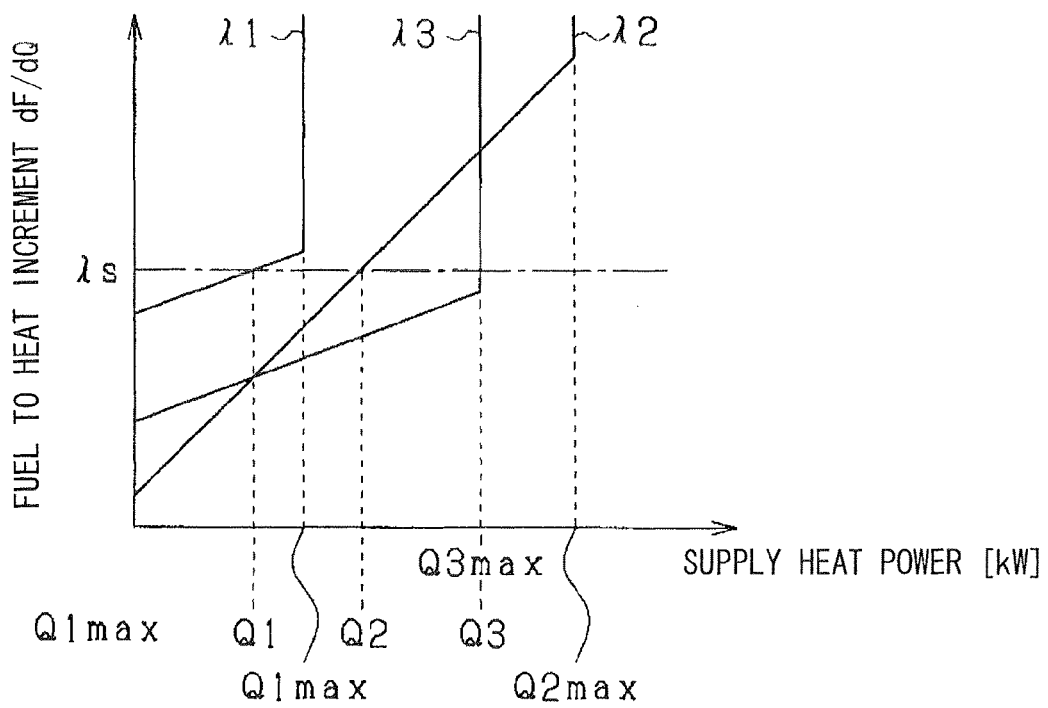
FIG. 11 is a graph to show a relationship between a supply heat power and a fuel to heat increment.

In the case where $\frac{dFi}{dQi} \geq \lambda s$   $Qi = Qi\,\text{min}$ where the conditions of the mathematical equations 6 to 8 can be expressed schematically in the manner shown in FIG. 11.

That is, in the case where the supply heat power reaches the upper limit value Qmax or the lower limit value Qmin, the supply heat power is limited by these values. Thus, in order to make the supply heat power of each of the heat sources become the supply heat power at the intersection of the fuel to heat increment of each of the heat sources and the specified λs, it is only necessary to change the fuel to heat increment up and down parallel to a vertical axis at the upper limit value Qmax and the lower limit value Qmin of the supply heat power of each of the heat sources. According to the drawing like this, the heat power that each of the heat sources supplies can be found as the supply heat power at the intersection of the fuel to heat increment of each of the heat sources and the specified λs.

For example, in the drawing, the respective supply heat power Q1 to Q3 of the respective heat sources 1 to 3 can be found as the supply heat power at the intersections of the values of the fuel to heat increment of the respective heat sources and the straight line of the specified λs. In other words, the supply heat power Q1 of the heat source 1 becomes the supply quantity Q1 between the lower limit value Q1 min (=0) and the upper limit value Q1 max, and the supply heat power Q2 of the heat source 2 becomes the supply quantity Q2 between the lower limit value Q2 min (=0) and the upper limit value Q2max, and the supply heat power Q3 of the heat source 3 becomes the upper limit value Q3max.

Subsequently, a relationship between a request heat power Qreq (total supply heat power) and a supply load distribution of the respective heat sources (optimum distribution heat power) is calculated on the basis of the heat power relationship found in this way. Here, for the sake of simplifying description, a description will be made for a case of two heat sources.

Figure 12:
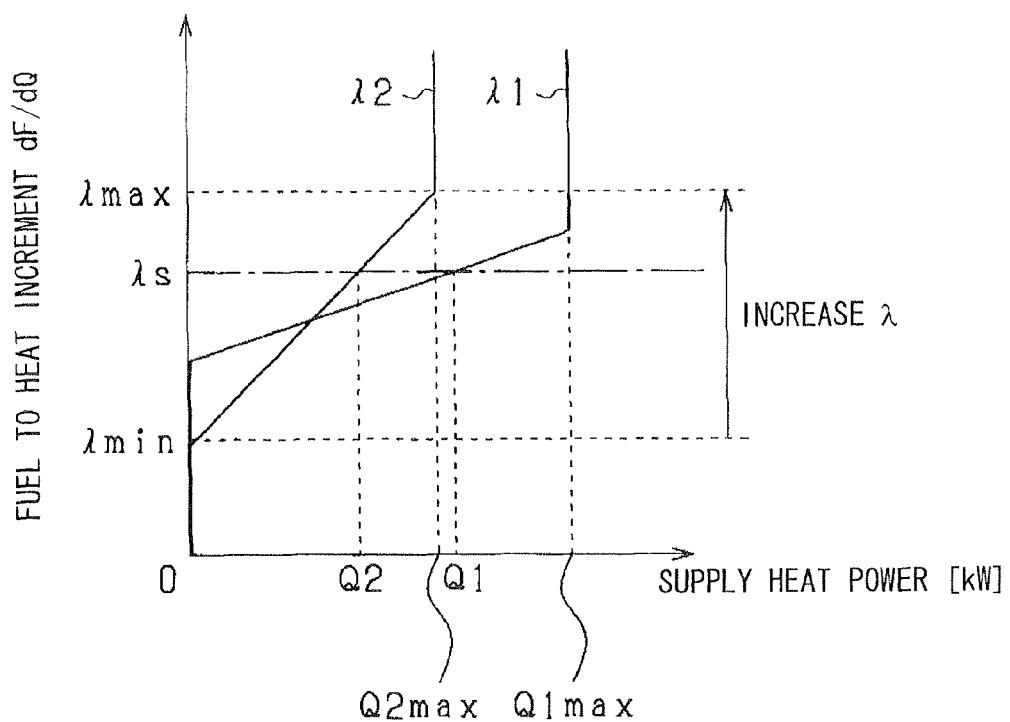
FIG. 12 is a graph to show a relationship between a supply heat power and a fuel to heat increment.

As shown in FIG. 12, it is assumed that the values of the fuel to heat increment of the heat sources 1, 2 to the supply heat power are expressed by λ1, λ2. At this time, while the supply heat power of the respective heat sources 1, 2 are optimally distributed, the sum total of the supply heat power Q1, Q2 is found at each time.

When describing this calculation in more detail, the value of the specified λs is increased from (added to) a fuel to heat increment when the supply heat power of the respective heat source 1, 2 become the lower limit values, that is, the minimum fuel to heat increment (λmin) of the values of the fuel to heat increment, whereby the straight line of λ is moved upward. Then, at each time, the supply heat power Q1, Q2 of the respective heat sources 1, 2 at the intersections of the values of the fuel to heat increment of the respective heat sources and the straight line of the specified λs and the sum total (Q1+Q2) of them are calculated. This processing is performed until the value of the specified λs is increased to a fuel to heat increment when the supply heat power of the respective heat source 1, 2 become the upper limit values, that is, the maximum fuel to heat increment (λmax) of the values of the fuel to heat increment. Then, a relationship between the sum total (Q1+Q2) of the supply heat power Q1, Q2 of the respective heat sources 1, 2 (total supply heat power) and the supply heat power Q1, Q2 of the respective heat sources (optimum distribution heat power) is calculated.

It is FIG. 13 that illustrates this relationship in a graph.

As shown in the drawing, for example, in the case where the request heat power Qreq is (Q1+Q2), it is only necessary to find a point where the total supply heat power of the horizontal axis becomes (Q1+Q2) and to read the optimum distribution heat power Q1, Q2 of the respective heat sources 1, 2 corresponding to them on the vertical axis. Thus, in the case where the request heat power Qreq is calculated, an optimum supply load distribution of the respective heat sources 1,2 (supply heat power Q1, Q2) can be calculated.

Here, as described above, a heat power obtained by subtracting an abnormal heat power Qpec from the request heat power Qreq is supplied to the heat exchange part from the plurality of heat sources except for the abnormal heat source, and the distribution of heat power supplied from the respective heat sources is determined in such a way that the heat cost of all of the heat resources except for the abnormal heat source is minimized. For this reason, in the following processing, the request heat power Qreq is corrected to a heat power obtained by subtracting the abnormal heat power Qpec from the request heat power Qreq (Qreq←Qreq−Qpec) and the following processing is performed to the heat sources except for the abnormal heat source. In this regard, in the case where the abnormal heat source does not exist, the following processing is performed for all of the heat sources with the request heat power Qreq held unchanged.

Next, there will be described the details of the processing of distributing base heat power Qbas(i) of the respective heat sources i (here, it is assumed that a heat source when i=1 is the heat power of the coolant of the engine and a heat source when i=2 is the heat power of a heat pump) to the respective heat sources i for the request heat power Qreq and then distributing a remaining request heat power Qreq_lef, which is a remainder of the request heat power Qreq, to the respective heat sources i.

Figure 14:
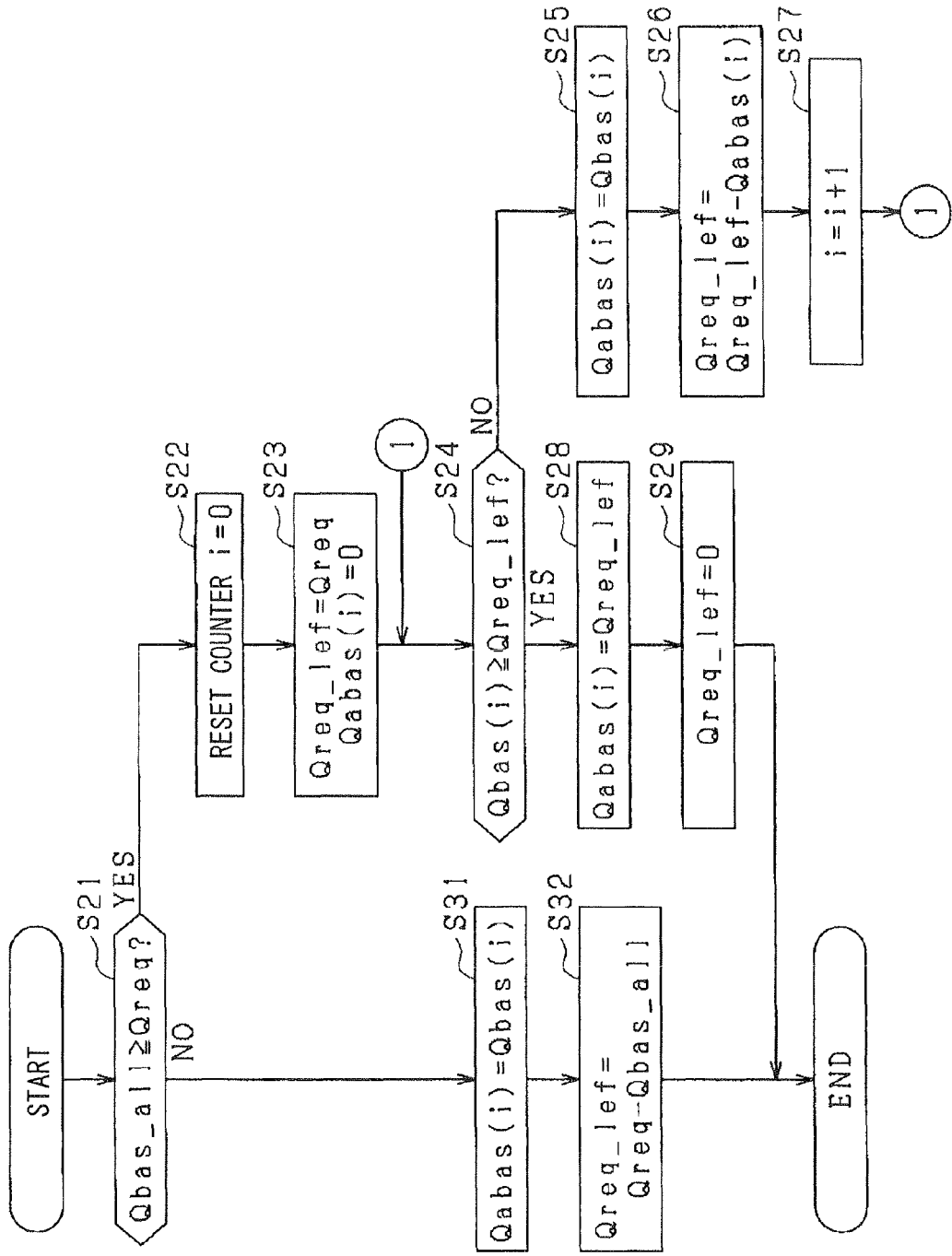
FIG. 14 is a flow chart to show a processing procedure of distributing a base heat power.

A processing procedure of a base heat power distribution will be shown in FIG. 14.

It is determined whether or not the total base heat power Qbas_all that is the sum total of the base heat power Qbas(i) of the respective heat sources i is the request heat power Qreq or more (S21). That is, it is determined whether or not the request heat power Qreq can be distributed entirely to total base heat power Qbas_all, in other words, whether or not the request heat power Qreq can be supplied by the total base heat power Qbas_all.

In the case where it is determined that the total base heat power Qbas_all is the request heat power Qreq or more (S21: YES), a counter i is reset (S22). Then, the remaining request heat power Qreq_lef, which is a remainder when the request heat power Qreq is distributed to the base heat power Qbas(i) of the respective heat sources i, firstly, is made the request heat power Qreq and all base heat power Qbas (i) are once set to 0 (S23).

Subsequently, it is determined whether or not the base heat power Qbas (i) of an i-th heat source is the remaining request heat power Qreq_lef or more (S24). In other words, it is determined whether or not the remaining request heat power Qreq_lef can be supplied by the base heat power Qbas (i) of the i-th heat source.

If it is determined in the above determination that the base heat power Qbas (i) of the i-th heat source is not the remaining request heat power Qreq_lef or more (S24: NO), the request base heat power Qabas(i), which the i-th heat source is requested to supply as a base heat power thereof, is set to the base heat power Qbas(i) (S25). In other words, it is requested for the i-th heat source to supply all of the base heat power Qbas(i).

Subsequently, the remaining request heat power Qreq_lef is updated to a value obtained by subtracting the base heat power Qbas(i) of the i-th heat source from the remaining request heat power Qreq_lef (S26) and then the counter i is incremented by one (S27).

The processings of S24 to S27 like this are repeatedly performed to sequentially distribute the remaining request heat power Qreq_lef to the base heat power Qbas(i) of the respective heat sources i. Then, if it is determined that the base heat power Qbas(i) of the i-th heat source is the remaining request heat power Qreq_lef or more (S24: YES), the request base heat power Qabas(i) of the i-th heat source is set to the remaining request heat power Qreq_lef (S28). In other words, the remaining request heat power Qreq_lef that remains last is distributed to the base heat power Qbas(i) of the i-th heat source.

Subsequently, the remaining request heat power Qreq_lef is set to 0 (S29), and then this series of processings are once ended (END). In other words, the remaining request heat power Qreq_lef that remains last is distributed to the base heat power Qbas(i) of the i-th heat source, so that the remaining request heat power Qreq_lef is set to 0.

On the other hand, if it is determined that the total base heat power Qbas_all is not the request heat power Qreq or more (S21: NO), the request base heat power Qabas(i) of all of the heat sources i are set to the base heat power Qbas(i) (S31). In other words, the request heat power Qreq cannot be supplied by the total base heat power Qbas_all, so that each of the heat sources i is requested to supply the base heat power Qbas(i) thereof.

Subsequently, the remaining request heat power Qreq_lef is updated to a value obtained by subtracting the total base heat power Qbas_all from the remaining request heat power Qreq_lef (S32) and then this series of processings are once ended (END).

Next, the distribution of the additional request heat power Qap1(*i*), which each of the heat sources i is requested to supply in addition to the base heat power Qbas(i), is determined.

Here, in the case where the remaining request heat power Qreq_lef is 0, the additional request heat power Qap1(*i*) of each of the heat sources i is set to 0. That is, in this case, it is not necessary to request for each of the heat sources i to supply a heat power in addition to the base heat power Qbas (i).

On the other hand, if the remaining request heat power Qreq_lef is not 0, the distribution of the additional request heat power Qap1(*i*) of the heat sources i is determined on the basis of the heat power relationship described above in the case where the remaining request heat power Qreq_lef is supplied. That is, in the example shown in FIG. 13, the total supply heat power (Q1+Q2) is set to the remaining request heat power Qreq_lef, and the optimum distribution heat power Q1, Q2 of the respective heat sources i corresponding to this are determined, and these optimum distribution heat power Q1, Q2 are set to the additional request heat power Qap1(*i*). In this way, the heat power to be supplied in the state where the heat cost is not 0 (heat power to be supplied in addition to the base heat power) can be optimally distributed to the respective heat sources i. In this regard, this series of processings correspond to a processing as a heat power distribution determination unit (heat distribution determination unit).

Thereafter, in S16 shown in FIG. 3, for the respective heat sources i, an order heat power Qa(i) for each heat source i is calculated as the sum of the distributed base heat power (request base heat power Qabas(i)) and the distributed additional request heat power Qap1(*i*).

The energy control device 51 sends the order heat power Qa(i) for each heat source i to the air-conditioning control device 54 and the engine control device, and the air-conditioning control device 54 and the engine control device control each heat source i in such a way that this order heat power Qa(i) is supplied. At this time, the air-conditioning control device 54 controls the operating states of the electrically operated pump 22 and the blower fan 24 in such a way that the heat power to be supplied into the cabin from the heater core 23 becomes the order heat power Qa(1). Moreover, the heat generation control controls the heat power generated by the engine by the use of the respective engine waste heat power control unit so as to generate the order heat power Qa(1).

Moreover, the air-conditioning control device 54 sends an order to the heat pump control device 38 to control the heat pump control device 38 in such a way that the heat power to be supplied into the cabin from the heat pump system becomes the order heat power Qa(2). At the same time, the air-conditioning control device 54 calculates the electric power that the heat pump system requires so as to generate the order heat power Qa(2).

The present embodiment described above in detail has the following advantages.

(1) The request heat power Qreq, which the plurality of heat sources (coolant heat power, heat pump system 30) are requested to supply to the heat exchange parts (heater core 23, indoor heat exchanger 37), that is, the heat power to be supplied to the heat exchange parts from the plurality of heat sources is calculated. On the other hand, the relationship between the heat power to supply and the heat cost Ct is calculated for each of the heat sources i. Moreover, of the respective heat sources i, the abnormal heat source that cannot normally supply heat is detected, and the abnormal heat power Qpec that is the heat power to be supplied by the abnormal heat source is calculated. That is, there is a case where the abnormal heat source supplies a heat power different from a normal heat power, so that the abnormal heat power supplied by this abnormal heat source is calculated.

Then, the distribution of the heat power to be supplied from the respective heat sources i is determined on the basis of the relationship between the heat power supplied from each heat source i and the heat cost Ct and the abnormal heat power Qpec described above in such a way that the sum total of the heat power supplied from the plurality of heat sources is equal to the request heat power Qreq and that the heat cost Ct of all of the heat sources to supply the heat is minimized. For this reason, even if the abnormal heat source is caused, the request heat power Qreq can be supplied to the heat exchange parts from the plurality of heat sources and the fuel quantity consumed in all of the plurality of heat sources can be inhibited.

(2) The actual heat power Qreal that is the sum total of the heat power to be actually supplied to the heat exchange parts from the plurality of heat sources is calculated on the basis of the heat power to be supplied into the cabin. That is, in the case where the abnormal heat source is caused, the sum total of the heat power (actual heat power Qreal) to be actually supplied to the heat exchange parts from the plurality of heat sources is calculated. Here, the heat sources except for the abnormal heat source supply the distributed heat power to the heat exchange parts, so that the sum total of the heat power to be supplied to the heat exchange parts from the heat sources except for the abnormal heat source can be calculated. Thus, by subtracting the sum total of the heat power, which is to be supplied to the heat exchange parts from the heat sources except for the abnormal heat source, from the actual heat power Qreal described above, the abnormal heat power Qpec described above can be calculated.

(3) A heat source for which the relationship between the heat power to be supplied from the heat source and the heat cost Ct cannot be acquired is detected as the abnormal heat source. Thus, even in the case where there is caused the heat source for which the relationship between the heat power to be supplied from the heat source and the heat cost Ct cannot be acquired, by treating the heat source as an abnormal heat source, the fuel quantity consumed in all of the plurality of heat sources can be inhibited.

(4) A heat source in which a processing load of calculating a heat power to be supplied from the heat source is larger than a specified load is detected as an abnormal heat source. For this reason, by treating the heat source in which the processing load of calculating a heat power to be supplied from the heat source is larger than the specified load as the abnormal heat source, the fuel quantity consumed in all of the plurality of heat sources can be inhibited. Further, there may be employed a construction such that a heat power to be supplied from the abnormal heat source is determined to be a specified constant value (for example, 0) and that the supply load distribution of the respective heat sources is calculated by setting the abnormal heat power Qpec, which is supplied from the abnormal heat source, to 0. That is, the heat power to be supplied from the abnormal heat source may be determined to be the specified constant value, so that the processing load of calculating the heat power to be supplied from the abnormal heat source can be reduced.

(5) The vehicle is mounted with the battery 43, and the plurality of heat sources include an electrically operated heat source (heat pump system 30) that transforms electric power to heat and supplies the heat, and in the case where the electric power cannot be normally supplied to the heat pump system 30 from the battery 43, the heat pump system 30 is detected as an abnormal heat source. Thus, even in the case where the electric power cannot be normally supplied to the electrically operated heat source from the battery 43, by treating the electrically operated heat source as an abnormal heat source, the fuel quantity consumed in all of the plurality of heat sources can be inhibited. Further, the heat power to be supplied from the heat pump system 30 may be determined to be 0 and the supply load distribution of the respective heat sources may be calculated by setting an abnormal heat power Qpec, which the abnormal heat source supplies, to 0. In this way, the heat power to be supplied from the heat pump system 30 may be set to 0, so that the remaining power of the battery 43 can be increased and the temperature can be brought close to a proper range.

(6) A heat source, in which the magnitude of a heat power to be supplied from the heat source is abnormal, is detected as an abnormal heat source. In other words, in the case where the magnitude of the heat power to be supplied from a heat source is out of a normal range because of various causes, the heat source is detected as an abnormal heat source. Even in this case, by treating the heat source that cannot supply a normal heat power as an abnormal heat source, the fuel quantity consumed in all of the plurality of heat sources can be inhibited.

(7) Assuming that a fuel quantity $Fi(Qi)$ consumed to supply a heat power in each heat source i is expressed by a function of a heat power Qi, a fuel to heat increment $dF/dQ$ is calculated that is a differential value obtained by first differentiating the function $Fi(Qi)$ of the heat power Qi with respect to the heat power Qi. A state where the values of the fuel to heat increment of the plurality of heat sources i are equal to each other is a state where the fuel quantity to be consumed cannot be decreased any more. Thus, by determining the supply load distribution of the respective heat sources i in such a way as to form the state, the total consumed fuel quantity f consumed in all of the plurality of heat sources can be minimized.

The distribution of the heat power to be supplied from the respective heat sources i is determined in such a way that the sum total of the heat power supplied from the plurality of heat sources is equal to the request heat power Qreq and that the values of the fuel to heat increment of the respective heat sources i are equal to each other. For this reason, the request heat power Qreq can be supplied to the heat exchange parts from the plurality of heat sources and the total consumed fuel quantity f consumed in all of the plurality of heat sources can be minimized. Moreover, at the time of determining the optimum supply load distribution of the respective heat sources i, the combination of the supply loads of the respective heat sources i does not need to be calculated by all possible regression method, so that an increase in the computation load can be inhibited.

(8) A heat power relationship, which is a relationship between the heat power Qi and the fuel to heat increment, is calculated in each heat source i. For this reason, in the case where the values of the fuel to heat increment of the respective heat sources i are changed in such a way as to be equal to each other, the heat power Qi corresponding to the fuel to heat increment can be calculated on the basis of the heat relationship in each heat source i. The distribution of the heat power to be supplied from the respective heat sources i is determined in such a way that the sum total of the heat power Qi of the respective heat sources i is equal to the request heat power Qreq, so that an increase in the computation load is further inhibited and the total consumed fuel quantity f consumed in all of the plurality of heat sources i can be minimized.

(9) The upper limit values Qimax of the heat power Qi are set that can be supplied from the respective heat sources i, and the values of the fuel to heat increment of the respective heat sources i are increased in such a way as to be equal to each other, and the heat power Qi corresponding to the fuel to heat increment is calculated on the basis of the heat power relationship in the respective heat sources i. In the heat source i in which its heat power Qi reaches the upper limit value Qimax, the heat power Qi to be supplied from the heat source i is set to the upper limit value Qimax, and the distribution of the heat power to be supplied from the other heat sources j is determined in such a way that the sum total of the fuel quantities $Fj(Qj)$ consumed in the other heat sources j is minimized.

In other words, in the heat sources j in which the heat power Qj to supply do not reach the upper limit values, the values of the fuel to heat increment of the respective heat sources j are increased in such a way as to be equal to each other. The distribution of the heat power Qi, Qj to be supplied from the respective heat sources i, j is determined in such a way that the sum total of the heat power Qj to be supplied from these heat sources j and the heat power Qi of the heat source i in which the heat source Qi to supply reaches the upper limit value Qimax is equal to the request heat power Qreq. Thus, the sum total of the fuel quantities $Fj(Qj)$ consumed in the heat sources j in which the heat power Qj to supply do not reach the upper limit values can be minimized, which by extension results in minimizing the total consumed fuel quantity f consumed in all of the plurality of heat sources.

(10) The above-described heat relationship in each of the heat sources i is calculated according to the operating state of the engine 10 mounted in the vehicle. For this reason, according to the operating state of the engine 10 at each time, the distribution of the heat power Qi to be supplied from the respective heat sources i can be properly determined.

(11) The plurality of heat sources include the heat generation control of the engine 10 mounted in the vehicle to supply heat to the heater core 23 via the coolant of the engine 10, and the engine 10 is mounted with the electrically operated pump 22 to discharge the coolant. The quantity of the coolant discharged by the electrically operated pump 22 is controlled on the basis of the heat power supplied from the heat generation control, so that the heat power supplied to the heater core 23 can be properly controlled.

The present invention is not limited to the embodiment described above but can be also carried out, for example, in the following manner.

In the embodiment described above, in the case where the discrepancy (difference or ratio) between the heat power supplied into the cabin, which is calculated on the basis of the temperature of the coolant, and the heat power supplied into the cabin, which is calculated from the information of the air-conditioned air, is larger than a specified degree, it is determined that the magnitude of the heat power supplied from the coolant is abnormal. Further, in the case where the discrepancy (difference or ratio) between the heat power supplied into the cabin, which is calculated on the basis of the operating state of the heat pump system 30, and the heat power supplied into the cabin, which is calculated from the information of the air-conditioned air, is larger than a specified degree, it is determined that the magnitude of the heat power supplied from the heat pump system 30 is abnormal.

However, in the case where there is provided a function of informing the heat power supplied from the respective heat sources, it may be determined on the basis of the informed heat power whether or not the magnitude of the heat power is abnormal. Specifically, in the case where the magnitude of the informed heat power is out of a specified range, or in the case where the informed heat power is suddenly changed, or in the case where the ratio between the informed heat power and the consumed fuel quantity or the consumed electric power is out of a specified range, it can be determined that the magnitude of the heat power is abnormal.

In the embodiment described above, either the abnormal heat power supplied from the heat pump system 30 (abnormal heat source) or the abnormal heat power supplied from the coolant (abnormal heat source) is set to 0, but in the case where the request heat power cannot be supplied from only either the coolant or the heat pump system 30, it may be recommended to employ the following method. That is, on the condition that the remaining power of the battery 43 is not smaller than a specified power, the coolant supplies the maximum heat power that the coolant can supply and the heat power that the heat pump system 30 supplies is made the heat power obtained by subtracting the same maximum heat power from the request heat power. Even in this case, a processing load can be reduced as compared with the calculation of optimizing the heat power to be supplied from these heat sources. In this regard, in the case where the maximum heat power that the coolant can supply is not sufficient for the request heat power, it is recommended that the heat generation control described above is carried out.

When the heat power supplied from the abnormal heat source is determined to be a specified constant value and the supply load distribution of the respective heat sources is calculated by setting the abnormal heat power, which the abnormal heat source supplies, to the specified constant value described above, the maximum value that the abnormal heat source can supply or the request heat power can be also employed as the specified constant value described above. At this time, it is recommended to employ a smaller value among the maximum value and the request heat power.

In the processings of S101 to S104 in FIG. 4, the processing of 17 may be performed at the same time for the plurality of processings.

In place of the heat pump system 30, a positive temperature coefficient (PTC) heater may be employed. In this case, it can be considered that the electric power supplied to the PTC heater is equal to the heat power supplied from the PTC heater, so that the calculation of finding the heat cost and the rest of the PTC heater can be easily performed. Moreover, the number of the plurality of heat sources can be arbitrarily set.

By controlling a fuel injection timing in place of the control of an ignition timing, the configuration described above can be also embodied in a diesel engine.

Summarizing the above embodiment, a vehicle heat source control device for controlling heat supply to a heat exchange part from a plurality of heat sources mounted in a vehicle, and the vehicle heat source control device including: a request heat power calculation unit configured to calculate a request heat power that the plurality of heat sources are requested to supply the heat exchange part; a heat cost calculation unit configured to calculate a relationship between a heat power that each of the plurality of heat sources supplies and a heat cost that is a fuel quantity consumed to supply a unit heat power; an abnormal heat source detection unit configured to detect an abnormal heat source that cannot normally supply a heat power from among the plurality of heat sources; an abnormal heat power calculation unit configured to calculate an abnormal heat power that is a heat power that the abnormal heat source supplies; and a heat distribution determination unit configured to determine a distribution of the heat power that the plurality of heat sources supply on the basis of the relationship between the heat power that each of the plurality of heat sources supplies and the heat cost and of the abnormal heat power in such a way that a sum total of the heat power, which the plurality of heat sources supply, is equal to the request heat power and that the heat cost of all of the plurality of heat sources to supply the heat power is minimized.

The inventors of this application conveyed configurations for reducing a heat cost that is a fuel quantity consumed to supply a unit heat power in order to reduce a fuel quantity consumed in a heat source to supply heat. The inventors reached a conclusion that in order to reduce the fuel quantities consumed in all of a plurality of heat sources to supply heat, it is effective to minimize the heat cost of all of the plurality of heat sources.

In this point, according to the construction described above, the request heat power that the plurality of heat sources are requested to supply to the heat exchange part, that is, the heat power that the plurality of heat sources are requested to supply to the heat exchange part are calculated. On the other hand, the relationship between the heat power that each of the plurality of heat sources supplies and the heat cost is calculated. Moreover, the abnormal heat source that cannot normally supply the heat power is detected from among the plurality of heat sources and the abnormal heat power of the heat power that the abnormal heat source supplies is calculated. In other words, there is a case where the abnormal heat source supplies a heat power different from a normal heat power, so that the abnormal heat power that this abnormal heat source supplies is calculated.

The distribution of the heat power that the plurality of heat sources supply is determined on the basis of the relationship between the heat power that each of the plurality of heat sources supplies and the heat cost and of the abnormal heat power in such a way that the sum total of the heat power, which the plurality of heat sources supply, is equal to the request heat power and that the heat cost of all of the plurality of heat sources to supply the heat power is minimized. For this reason, even in the case where the abnormal heat source is caused, the request heat power can be supplied to the heat exchange part from the plurality of heat sources and a fuel quantity consumed in all of the plurality of heat sources can be inhibited.

In the abnormal heat source, the heat power cannot be controlled so as to reduce the heat cost and the consumed fuel quantity cannot be inhibited. For this reason, in order to reduce the fuel quantity consumed in all of the plurality of heat sources, the fuel quantities consumed in all of the plurality of heat sources except for the abnormal heat source need to be minimized.

Specifically, it is possible to employ a construction such that the heat distribution determination unit determines a distribution of the heat power that the plurality of heat sources supply in such a way that the sum total of the heat power, which the plurality of heat sources supply, is equal to the request heat power and that the heat cost of all of the plurality of heat sources except for the abnormal heat source is minimized.

The present configuration includes an actual heat power calculation unit configured to calculate an actual heat power that is a sum total of heat power actually supplied to the heat exchange part from the plurality of heat sources on the basis of a heat power supplied into a cabin of the vehicle, and the abnormal heat power calculation unit calculates the abnormal heat power by subtracting a sum total of heat power supplied to the heat exchange part from the heat sources except for the abnormal heat source from the actual heat power.

According to the construction described above, on the basis of the heat power supplied into the cabin of the vehicle, the actual heat power is calculated which is the sum total of the heat power actually supplied to the heat exchange part from the plurality of heat sources. That is, in the case where the abnormal heat source is caused, the sum total (actual heat power) of the heat power actually supplied to the heat exchange part from the plurality of heat sources is calculated.

Here, the heat sources except for the abnormal heat source supply the distributed heat power to the heat exchange part, so that the sum total of the heat power actually supplied to the heat exchange part from the plurality of heat sources except for the abnormal heat source can be calculated. Thus, the abnormal heat power can be calculated by subtracting the sum total of the heat power supplied to the heat exchange part from the heat sources except for the abnormal heat source from the actual heat power described above.

When an abnormality is caused in the communications between the heat cost calculation unit and the heat distribution determination unit, there is a case where the relationship between the heat power that the heat source supplies and the heat cost cannot be acquired. In this case, the heat power that the heat source supplies cannot be calculated on the basis of the relationship between the heat power that the heat source supplies and the heat cost.

In this point, the present configuration employs a construction that the abnormal heat source detection unit detects a heat source, in which the relationship between the heat power that each of the plurality of heat sources supplies and the heat cost cannot be acquired, as the abnormal heat source. Thus, even in the case where there is caused a heat source in which the relationship between the heat power that the heat source supplies and the heat cost cannot be acquired, the heat source is treated as an abnormal heat source to thereby inhibit a fuel quantity consumed in all of the plurality of heat sources.

A processing load of calculating the heat power that the heat source supplies is different according to the kind of the heat source and is varied also by the state of the vehicle and the rest. For this reason, in a specified heat source, the processing load of calculating the heat power to supply is made too large, which presents a possibility that the heat power to supply cannot be properly calculated.

In this point, the present configuration employs a construction that the abnormal heat source detection unit detects a heat source, in which a processing load of calculating the heat power that the heat source supplies is larger than a specified processing load, as the abnormal heat source. For this reason, it is possible to treat the heat source, in which the processing load of calculating the heat power that the heat source supplies is large than the specified processing load, as the abnormal heat source and to inhibit the fuel quantity consumed in all of the plurality of heat sources.

Moreover, it may be effective for the present configuration to employ a construction that the fuel quantity distribution determination unit determines a heat power, which the abnormal heat source supplies, to be a specified value and that the abnormal heat power calculation unit calculates an abnormal heat power, which the abnormal heat source supplies, as the specified constant value. According to the construction, the heat power, which the abnormal heat source supplies, is determined to be the specified constant value, so that the processing load of calculating the heat power, which the abnormal heat source supplies, can be reduced. In this regard, as for the specified constant value, for example, 0 or the smaller value of a maximum value that the abnormal heat source can supply and the request heat power can be employed.

In the electrically operated heat source that transforms electric power to heat and supplies the heat, the proper supply of electric power from a power source is a condition for supplying heat normally. However, a battery to supply electric power presents a possibility that because a remaining power becomes scarce or its temperature becomes out of a proper range, electric power cannot be normally supplied.

In this point, the present configuration employs the following construction: that is, the vehicle is mounted with a battery; and the plurality of heat sources include an electrically operated heat source that transforms electric power to heat and supplies the heat; and in the case where the battery cannot normally supply the electric power to the electrically operated heat source, the abnormal heat source detection unit detects the electrically operated heat source as the abnormal heat source. Thus, even in the case where the battery cannot normally supply electric power to the electrically operated heat source, by treating the electrically operated heat source as an abnormal heat source, the fuel quantity consumed in all of the plurality of heat sources can be inhibited.

Moreover, it may be effective for the present configuration to employ a construction that the heat distribution determination unit determines the heat power, which the abnormal heat source supplies, to be 0 and that the abnormal heat power calculation unit calculates the abnormal heat power, which the abnormal heat source supplies, as 0. According to the construction, the heat power that the abnormal heat source (electrically operated heat source) supplies is determined to be 0, so that it is possible to increase the remaining power of the battery and to bring the temperature closer to the proper range.

Furthermore, the present configuration can employ also a construction that the abnormal heat source detection unit detects a heat source, in which the heat power that the heat source supplies is abnormally large in magnitude, as the abnormal heat source. That is, in the case where the magnitude of the heat power that a heat source supplies is out of the normal range because of various reasons, the heat source is detected as an abnormal heat source. Even in the construction like this, by treating the heat source that cannot supply a normal heat power as an abnormal heat source, the fuel quantity consumed in all of the plurality of heat sources can be inhibited.

The present configuration may include a fuel to heat increment calculation unit configured to calculate a fuel to heat increment that is a differential value obtained by differentiating a fuel quantity that is consumed to supply a heat power in each of the plurality of heat sources and is expressed as a function of the heat power, and the heat distribution determination unit determines a distribution of the heat power that the plurality of heat sources supply in such a way that the sum total of the heat power that the plurality of heat sources supply is equal to the request heat power and that the values of the fuel to heat increment of the plurality of heat sources except for the abnormal heat source are equal to each other.

The present configuration may include a fuel to heat increment calculation unit configured to calculate a fuel to heat increment being a ratio between increment in a fuel quantity, which is consumed in each of the plurality of heat sources to supply a heat power, to increment in the heat power. In this case, a heat distribution determination unit may be configured to determine distribution of heat power supplied from the plurality of heat sources based on both: the relationship between the heat power supplied from each of the plurality of heat sources and the heat cost; and the abnormal heat power, such that: a sum total of the heat power supplied from the plurality of heat sources coincides with the request heat power; and values of the fuel to heat increment of the plurality of heat sources except for the abnormal heat source coincide with each other thereby to minimize the heat cost of all of the plurality of heat sources except for the abnormal heat source.

According to the construction described above, the fuel to heat increment is calculated which is the differential value obtained by differentiating the fuel quantity that is consumed to supply a heat power in each of the plurality of heat sources and is expressed as the function of the heat power. This fuel to heat increment shows how much the fuel quantity to be consumed is increased in the case where the heat power supplied by the heat source is increased by a small quantity.

In the case where the plurality of heat sources supply the request heat power, the heat cost of all of the plurality of heat sources can be minimized by determining the distribution of the heat power that the plurality of heat sources supply (supply load distribution of the respective heat sources) in the following manner. As a result, the fuel quantity consumed in all of the plurality of heat sources can be minimized.

For example, in a certain state, it is assumed that in the case where a each of a heat source 1 and a heat source 2 supplies heat to a heat exchange part, the values of the fuel to heat increment of the heat source 1 and the heat source 2 are 200 g/kWh and 210 g/kWh, respectively. Then, it is assumed that a heat power that the heat source 1 supplies is increased by 1 kW and that a heat power that the heat source 2 supplies is decreased by 1 kW. As a result, the sum total of the heat power supplied by the heat source 1 and the heat source 2 is not changed, but the sum total of the fuel quantities consumed in the heat source 1 and the heat source 2 is decreased by 10 g/h.

That is, the above description means that in the case where there is a difference in the fuel to heat increment between the plurality of heat sources, the fuel quantities to be consumed can be decreased without changing the sum total of the heat power to be supplied. In other words, the state where the fuel quantity increment fuel quantities of the plurality of heat sources are equal to each other is the state where the fuel quantities to be consumed in all of the plurality of heat sources cannot be decreased any more. Thus, by determining the supply load distribution of the heat power of the plurality of heat sources except for the abnormal heat source so as to form the state, the fuel quantities consumed in all of the plurality of heat sources except for the abnormal heat source can be minimized.

In this point, according to the construction described above, the distribution of the heat power that the plurality of heat sources supply is determined in such a way that the sum total of the heat power, which the plurality of heat sources supply, is equal to the request heat power and that the values of the fuel to heat increment of the plurality of heat sources except for the abnormal heat source are equal to each other. For this reason, it is possible to supply the request heat power to the heat exchange part from the plurality of heat sources and to inhibit the fuel quantities consumed in all of the plurality of heat sources. Furthermore, when an optimum supply load distribution of the plurality of heat sources is determined, it is not necessary to calculate the supply load distribution for all possible combinations of them, which can hence inhibit an increase in computation load.

The above structures of the embodiments can be combined as appropriate.

The above processings such as calculations and determinations are not limited being executed by the control devices 38, 51, 52, 53, 54. The control unit may have various structures including the control devices shown as an example.

The above processings such as calculations and determinations may be performed by any one or any combinations of software, an electric circuit, a mechanical device, and the rest. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicle heat source control device configured to control heat supply from a plurality of heat sources equipped in a vehicle to a heat exchange part, the vehicle heat source control device comprising:
a request heat power calculation unit configured to calculate a request heat power, which is requested to the plurality of heat sources to supply to the heat exchange part;
a heat cost calculation unit configured to calculate a relationship between a heat power supplied from each of the plurality of heat sources and a heat cost being a fuel quantity consumed to supply a unit heat power;

an abnormal heat source detection unit configured to detect an abnormal heat source, which is incapable of normally supplying a heat power, from the plurality of heat sources;

an abnormal heat power calculation unit configured to calculate an abnormal heat power, which is a heat power supplied from the abnormal heat source; and a heat distribution determination unit configured to determine distribution of heat power supplied from the plurality of heat sources based on both:
the relationship between the heat power supplied from each of the plurality of heat sources and the heat cost; and
the abnormal heat power, such that:
a sum total of the heat power supplied from the plurality of heat sources coincides with the request heat power; and
the heat cost of all of the plurality of heat sources to supply the heat power is minimized.

2. The vehicle heat source control device according to claim 1, wherein
the heat distribution determination unit is further configured to determine the distribution of the heat power supplied from the plurality of heat sources, such that:
the sum total of the heat power supplied from the plurality of heat sources coincides with the request heat power; and
the heat cost of all of the plurality of heat sources except for the abnormal heat source is minimized.

3. The vehicle heat source control device according to claim 1, further comprising:
an actual heat power calculation unit configured to calculate an actual heat power, which is a sum total of heat power actually supplied from the plurality of heat sources to the heat exchange part, based on a heat power supplied into a cabin of the vehicle, wherein
the abnormal heat power calculation unit is further configured to calculate the abnormal heat power by subtracting a sum total of heat power, which is supplied from the heat sources except for the abnormal heat source to the heat exchange part, from the actual heat power.

4. The vehicle heat source control device according to claim 1, wherein the abnormal heat source detection unit is further configured to detect a heat source, in which the relationship between a heat power supplied from the heat source and the heat cost cannot be acquired, as the abnormal heat source.

5. The vehicle heat source control device according to claim 1, wherein the abnormal heat source detection unit is further configured to detect a heat source, in which a processing load for calculating a heat power supplied from the heat source is larger than a specified processing load, as the abnormal heat source.

6. The vehicle heat source control device according to claim 1, wherein
the vehicle is equipped with a battery,
the plurality of heat sources include an electrically operated heat source configured to convert an electric power into a heat and to supply the heat, and
the abnormal heat source detection unit is further configured to, when the battery is incapable normally supplying the electric power to the electrically operated heat source, detect the electrically operated heat source as the abnormal heat source.

7. The vehicle heat source control device according to claim 1, wherein the abnormal heat source detection unit is further configured to detect a heat source, in which a heat power supplied from the heat source is abnormally large, as the abnormal heat source.

8. The vehicle heat source control device according to claim 1, further comprising:
a fuel to heat increment calculation unit configured to calculate a fuel to heat increment, which is a differential value obtained by differentiating a fuel quantity being a function of the heat power and consumed in each of the plurality of heat sources to supply the heat power, wherein
the heat distribution determination unit determines the distribution of the heat power supplied from the plurality of heat sources, such that:
the sum total of the heat power supplied from the plurality of heat sources coincides with the request heat power; and
the fuel to heat increment of the plurality of heat sources except for the abnormal heat source coincide with each other.

9. A vehicle heat source control device configured to control heat supply from a plurality of heat sources equipped in a vehicle to a heat exchange part, the vehicle heat source control device comprising:
a request heat power calculation unit configured to calculate a request heat power, which is requested to the plurality of heat sources to supply to the heat exchange part;
a heat cost calculation unit configured to calculate a relationship between a heat power supplied from each of the plurality of heat sources and a heat cost being a fuel quantity consumed to supply a unit heat power;
an abnormal heat source detection unit configured to detect an abnormal heat source, which is incapable of normally supplying a heat power, from the plurality of heat sources;
an abnormal heat power calculation unit configured to calculate an abnormal heat power, which is a heat power supplied from the abnormal heat source; and
a heat distribution determination unit configured to determine distribution of heat power supplied from the plurality of heat sources based on both:
the relationship between the heat power supplied from each of the plurality of heat sources and the heat cost; and
the abnormal heat power, such that:
a sum total of the heat power supplied from the plurality of heat sources coincides with the request heat power; and
the heat cost of all of the plurality of heat sources except for the abnormal heat source is minimized.

10. A vehicle heat source control device configured to control heat supply from a plurality of heat sources equipped in a vehicle to a heat exchange part, the vehicle heat source control device comprising:
a request heat power calculation unit configured to calculate a request heat power, which is requested to the plurality of heat sources to supply to the heat exchange part;
a heat cost calculation unit configured to calculate a relationship between a heat power supplied from each of the plurality of heat sources and a heat cost being a fuel quantity consumed to supply a unit heat power;

an abnormal heat source detection unit configured to detect an abnormal heat source, which is incapable of normally supplying a heat power, from the plurality of heat sources;

an abnormal heat power calculation unit configured to calculate an abnormal heat power, which is a heat power supplied from the abnormal heat source;

a fuel to heat increment calculation unit configured to calculate a fuel to heat increment being a ratio between increment in a fuel quantity, which is consumed in each of the plurality of heat sources to supply a heat power, to increment in the heat power; and a heat distribution determination unit configured to determine distribution of heat power supplied from the plurality of heat sources based on both:
- the relationship between the heat power supplied from each of the plurality of heat sources and the heat cost; and
- the abnormal heat power, such that:
  - a sum total of the heat power supplied from the plurality of heat sources coincides with the request heat power; and
  - values of the fuel to heat increment of the plurality of heat sources except for the abnormal heat source coincide with each other thereby to minimize the heat cost of all of the plurality of heat sources except for the abnormal heat source.

11. A method for controlling heat supply from a plurality of heat sources equipped in a vehicle to a heat exchange part, the method comprising:

calculating, using a processor, a request heat power, which is requested to the plurality of heat sources to supply to the heat exchange part;

calculating a relationship between a heat power supplied from each of the plurality of heat sources and a heat cost, which is a fuel quantity consumed to supply a unit heat power;

detecting an abnormal heat source, which is incapable of normally supplying a heat power, from the plurality of heat sources;

calculating an abnormal heat power being a heat power supplied from the abnormal heat source; and determining distribution of heat power supplied from the plurality of heat sources based on both:
- the relationship between the heat power supplied from each of the plurality of heat sources and the heat cost; and
- the abnormal heat power, such that:
  - a sum total of the heat power supplied from the plurality of heat sources coincides with the request heat power; and
  - the heat cost of all of the plurality of heat sources to supply the heat power is minimized.

12. A non-transitory computer-readable storage medium encoded with instructions for causing a processor to execute the method according to claim 11.

* * * * *